(12) United States Patent  (10) Patent No.: US 8,271,578 B2
Sheffi et al.  (45) Date of Patent: Sep. 18, 2012

(54) BIDIRECTIONAL DATA TRANSFER OPTIMIZATION AND CONTENT CONTROL FOR NETWORKS

(75) Inventors: Guy Sheffi, RaAnana (IL); Ovadi Somech, Rishon-LeZion (IL)

(73) Assignee: B-Obvious Ltd., Herzlia Pituach (IL)

( * ) Notice: Subject to any disclaimer, the term of this patent is extended or adjusted under 35 U.S.C. 154(b) by 1131 days.

(21) Appl. No.: 11/792,535

(22) PCT Filed: Dec. 8, 2005

(86) PCT No.: PCT/IL2005/001331
§ 371 (c)(1),
(2), (4) Date: Jun. 7, 2007

(87) PCT Pub. No.: WO2006/061843
PCT Pub. Date: Jun. 15, 2006

(65) Prior Publication Data
US 2010/0281051 A1  Nov. 4, 2010

Related U.S. Application Data

(60) Provisional application No. 60/661,001, filed on Mar. 14, 2005, provisional application No. 60/634,084, filed on Dec. 8, 2004.

(51) Int. Cl.
*G06F 15/16* (2006.01)
(52) U.S. Cl. ........ 709/203; 709/224; 709/225; 709/246; 704/7; 704/10; 704/243; 704/244; 704/251; 707/100; 341/51
(58) Field of Classification Search .................. 709/203, 709/224, 225, 246; 704/7, 10, 243, 244, 704/251; 707/3, 100; 341/51
See application file for complete search history.

(56) References Cited

U.S. PATENT DOCUMENTS 4,628,306 A   12/1986  Root
(Continued)

FOREIGN PATENT DOCUMENTS

CN   1528052   9/2004
(Continued)

OTHER PUBLICATIONS

International Preliminary Report on Patentability Dated Aug. 16, 2007 From the International Preliminary Examining Authority Re.: Application No. PCT/IL05/01331.
(Continued)

*Primary Examiner* — Thuong Nguyen

(57) ABSTRACT

A method of transferring data objects over a network comprises intercepting a network transfer message with a passing object, creating a unique identifier for the object using a predetermined function, the same function having been used to provide identifiers for objects stored at predetermined nodes of said network, removing the object and sending on the network transfer message with the unique identifier in place of the object. Then, at the recipient end it is possible to obtain the unique identifier and use it as a key to search for a corresponding object in the local nodes. The search starts with a node closest to the recipient and steadily spreads outwards. The object when found is reattached for the benefit of the recipient and network bandwidth has been saved by the avoidance of redundant transfer since the object is brought to the recipient from the node which is the closest to him.

21 Claims, 28 Drawing Sheets
(19 of 28 Drawing Sheet(s) Filed in Color)

U.S. PATENT DOCUMENTS

| | | | |
|---|---|---|---|
| 5,392,454 | A | 2/1995 | Kowal et al. |
| 5,586,030 | A | 12/1996 | Kemner et al. |
| 5,841,376 | A * | 11/1998 | Hayashi .......................... 341/51 |
| 6,012,057 | A | 1/2000 | Mayer et al. |
| 6,285,860 | B1 | 9/2001 | Szarka et al. |
| 6,338,062 | B1 * | 1/2002 | Liu ........................................ 1/1 |
| 6,360,215 | B1 * | 3/2002 | Judd et al. .............................. 1/1 |
| 6,545,607 | B2 | 4/2003 | Bredow et al. |
| 6,567,806 | B1 | 5/2003 | Tsuchida et al. |
| 7,370,120 | B2 * | 5/2008 | Kirsch et al. .................. 709/246 |
| 2002/0057213 | A1 | 5/2002 | Heath |
| 2002/0059204 | A1 | 5/2002 | Harris |
| 2002/0107918 | A1 * | 8/2002 | Shaffer et al. ................. 709/203 |
| 2002/0152219 | A1 * | 10/2002 | Singh ............................. 707/101 |
| 2003/0187856 | A1 * | 10/2003 | Luk et al. ....................... 707/100 |
| 2003/0208472 | A1 * | 11/2003 | Pham ................................ 707/2 |
| 2004/0030806 | A1 | 2/2004 | Pandya |
| 2004/0088404 | A1 | 5/2004 | Aggarwal et al. |
| 2004/0138978 | A1 | 7/2004 | Zhang et al. |
| 2005/0125627 | A1 | 6/2005 | Kilian et al. |
| 2005/0198286 | A1 | 9/2005 | Xu et al. |
| 2006/0149719 | A1 * | 7/2006 | Harris ................................ 707/3 |
| 2012/0166586 | A1 | 6/2012 | Sheffi et al. |

FOREIGN PATENT DOCUMENTS

| | | |
|---|---|---|
| WO | WO 02/073810 | 9/2002 |
| WO | WO 03/050701 | 6/2003 |
| WO | WO 2006/061843 | 6/2006 |

OTHER PUBLICATIONS

Examination Report Dated Nov. 3, 2009 From the Intellectual Property Office of New Zealand Re.: Application No. 556367.
Examination Report Dated May 29, 2009 From the intellectual Property Office of New Zealand Re.: Application No. 556367.
International Preliminary Report on Patentability Dated Jun. 21, 2007 From the International Bureau of WIPO Re.: Application No. PCT/IL2005/001331.
International Search Report and the Written Opinion Dated Nov. 21, 2006 From the International Searching Authority Re.: Application No. PCT/IL05/01331.
Response Dated May 2, 2010 to Examination Report of Nov. 3, 2009 From the Intellectual Property Office of New Zealand Re.: Application No. 556367.
Response Dated Jun. 8, 2010 to Office Action of Mar. 10, 2010 From the State Intellectual Property Office of the People's Republic of China Re.: Application No. 200580047905.3.
Translation of Office Action Dated Mar. 10, 2010 From the State Intellectual Property Office of the People's Republic of China Re.: Application No. 200580047905.3.
Examiner's Report Dated Apr. 15, 2010 From the Australian Government, IP Australia Re. Application No. 2005312895.
Translation of Office Action Dated Aug. 25, 2010 From the State Intellectual Property Office of the People's Republic of China Re.: Application No. 200580047905.3.
Response Dated Apr. 13, 2011 to Examiner's Report of Apr. 15, 2010 From the Australian Government, IP Australia Re. Application No. 2005312895.
Examiner's Report Dated May 13, 2011 From the Australian Government, IP Australia Re. Application No. 2005312895.
Examiner's Report Dated Aug. 26, 2011 From the Australian Government, IP Australia Re. Application No. 2005312895.
Response Dated Sep. 12, 2011 to Office Action of May 24, 2011 From the Israel Patent Office Re. Application No. 183793.
Examiner's Report Dated Jan. 9, 2012 From the Australian Government, IP Australia Re. Application No. 2005312895.
Response Dated Dec. 12, 2011 to Examiner's Report of Aug. 26, 2011 From the Australian Government, IP Australia Re. Application No. 2005312895.
Examiner's Report Dated Dec. 23, 2011 From the Australian Government, IP Australia Re. Application No. 2005312895.
Office Action Dated May 24, 2011 From the Israel Patent Office Re. Application No. 183793 and Its Translation Into English.
Response Dated Jul. 22, 2011 to Examiner's Report of Apr. 15, 2010 From the Australian Government, IP Australia Re. Application No. 2005312895.
Office Action Dated May 15, 2012 From the Israel Patent Office Re. Application No. 183793 and Its Translation Into English.

* cited by examiner

Conventional URL-indexed cache

```
if cache[URL] == correct payload
    conventional_payload_hit++
else
    new_payload_miss_or_redundant_transfer++
    send URL
    receive payload
    cache[URL] := payload
```

"Frugal" cache

```
if u_cache[URL] == correct payload
    conventional_payload_hit++
else
    send URL
    receive payload digest
    if d_cache[digest] == correct payload
        redundant_transfer_avoided_hit++
        send "don't bother"
    else
        new_payload_miss++
        send "proceed"
        receive payload
        d_cache[digest] := payload
    u_cache[URL] := payload
```

First client request:
HEAD /images/logo.gif HTTP/1.1
Host: example.com
Want-Digest: MD5

First server response:
HTTP/1.1 200 OK
Date: Tue, 30 Jul 2002 18:30:05 GMT
Digest: md5=HUXZLQLRnI/H25KDcJPcOA==
Cache-control: max-age=3600
ETag: "xyzzy"

Second client request:
GET /images/logo.gif HTTP/1.1
Host: example.com

Second server response:
HTTP/1.1 200 OK
Date: Tue, 30 Jul 2002 18:30:05 GMT
Digest: md5=HUXZLQLRnI/H25KDcJPcOA==
Cache-control: max-age=3600
ETag: "xyzzy"

(message body omitted)

Fig. 21

| Version (4 bits) | Header Length (4 bits) | Packet Length (16 bits) | Random Number - X | Packet Identifier (16 bits) | Function Outcome - f(x), g(x) | Fragmentation Data (16 bits) | Time to Live (8 bits) | Protocol (8 bits) | Header Checksum (16 bits) | Source Address (32 bits) | Destination Address (32 bits) | Type of Service (8 bits) |

Fig. 24

BIDIRECTIONAL DATA TRANSFER OPTIMIZATION AND CONTENT CONTROL FOR NETWORKS

RELATED APPLICATIONS

This Application is a National Phase of PCT Patent Application No. PCT/IL2005/001331 having International Filing Date of Dec. 8, 2005, which claims the benefit of U.S. Provisional Patent Application No. 60/634,084 filed on Dec. 8, 2004. The contents of the above Applications are all incorporated herein by reference.

FIELD AND BACKGROUND OF THE INVENTION

The present invention relates to bidirectional object transfer and content control for networks and, more particularly, but not exclusively to such bidirectional object transfer for networks that reduces redundant transfer of objects over the network and is also able to carry out content manipulation without any privacy violation, thereby to improve network utilization and gain control over the of the data transferred therein.

Network communications today are mostly based on pre-defined objects such as files, web-pages, email attachments, etc. These objects may be shared via various communication methods, over various networks including the Internet, the cellular network, an intranet, etc. Many of the objects are widely shared and as such travel existing connections over and over again. The duplicated transmission of these objects leads to a dramatic rise in bandwidth consumption, and consequent increases in server load and latency. Redundancies over the network can often lead to lower network performance and therefore create a need for additional investment in network infrastructure.

Conventional object transfer has the effect of loading network paths that lead from the sender to the receiver, causing high network load, high latency and lower performance on these network paths.

Data communication networks today allow transmission of data objects without almost any restrictions, and this can lead to transference of illegal data such as viruses/worms/copyrighted material etc. Indeed a very high percentage of email that is transferred is multiple copies of the same unsolicited advertisement, commonly known as spam or junk mail.

Conversion of objects today, say between different types of formats suitable for different operating systems or hardware architectures, usually involves manual search and/or cpu intensive processes.

Current Solutions

Cryptographic Keys, Hashing and Electronic Verification of Files

Another issue relevant to the present invention is that of electronic file verification. With the rapid growth of electronic file usage, manually verifying the content of every file in a file system becomes not only time consuming, but can also lead to human-error during checking and is therefore unfeasible.

In the early days of computing forensics, electronically verifying file integrity began to play an important role. As the data stored in a suspect disk is vulnerable and yet needs to be retained for evidential use, forensic specialists are often required to acquire an exact mirror image of a suspect's disk drive for comprehensive examination. For this reason, a strong cryptographic hash function is required which can offer a useful and handy way for an examiner to verify data integrity. That is to say the hash function is a function of the bit sequence in the file. If the bit sequence changes, meaning someone has tampered with the file, the hash function produced is changed. In this way it is possible to determine whether the drive has been tampered with.

There are several well-known hashing algorithms used in cryptography. These include the following:

Message digest hash functions, MD2, MD4, and MD5, which are used for hashing messages into a shorter value called a message digest.

The Secure Hash Algorithm (SHA), a standard algorithm, that makes a larger (160-bit) message digest and is similar to MD4.

Cryptographic keys are mainly used today for file integrity verification in storage and network systems.

Mathematical Theory of Hash Functions

The mathematical theories of hash functions provide the following properties:

If a file F gives a hash value H1, then every single bit of H1 is a function of all bits of F.

If a file F gives a hash value H1, then modifying F by a single bit will result in a totally different hash value.

If a file F gives a hash value H1, then given another hash value H2 not equal to H1, it is computationally impossible to purposely modify part of F (such as modifying the last 10 bytes) such that the newly modified file will produce H2 as the hash value.

The chance of two randomly selected files having the same hash value is extremely small. For example, the chance of two files have the same MD5 hash value, which has 128 bits, will be $1/(2^{128})$, roughly equal to $1/(3.4 \times 10^{38})$, or roughly the chance of one in 340 billion billion billion billion. This may be compared with real life scenarios: the published chance of winning first prize in the Hong Kong Mark Six (the lotto game in Hong Kong which involves randomly picking 6 numbers between 1 and 47) is one in 10,737,573, and the published probability of winning the United States Pennsylvania Super 6 Lotto is one in 39 millions. Therefore, the chance of having two files with the same MD5 hash values is similar to the chance of winning 30,000 billion billion billion Hong Kong Mark Six first prizes. The chance of two files having identical SHA-1 hash values is even smaller since a SHA-1 hash value has 160 bits.

WAN Optimization Solutions

WAN optimization products enable users to move more information with better performance at a reduced cost. A broad set of solutions as shown below, were developed to improve the efficiency of WAN connections.

Basic Caching

The Internet world has long understood the inefficiencies of repeatedly transferring an unchanged file across the WAN. To combat this problem, a variety of file caching and file distribution solutions have been developed. Web page caching, employed by many Internet service providers to decrease bandwidth usage, seeks to solve a similar problem by first checking a server close to the user for a cached copy of a Web page before requesting a download from the actual Web site. If the page is found in a local cache, it is sent directly from the local cache, avoiding the need to load the Web page again across the WAN.

Packet Shaping

Packet shaping is used to allocate limited bandwidth resources to match a corporation's priorities. Important or delay sensitive traffic is sent across a WAN connection before less important, or more delay tolerant traffic is sent.

Basic Compression

Today data compression is used in a number of applications, including digital music, cellular phone networks, and satellite video transmission. Many branch office routers support various forms of network-oriented data compression, including IP header and payload compression. Data compression, in its simplest form, works by identifying and then replacing redundant patterns in a stream of data with smaller symbols.

Ultra Compression

Ultra compression combines basic compression and pattern recognition schemes with innovative data caching solutions. Although ultra compression solutions work similarly to basic compression, ultra compression algorithms are application and packet agnostic, allowing them to achieve potentially greater compression ratios.

In simple terms, ultra compression undoes basic compression's conventional approach to limiting the scope of compression to the file or packet level.

A compressor element on the sending side reviews traffic passing through it for patterns. The sending side develops a lookup table, or dictionary, of unique bit patterns. Using the same algorithm, the receiving side develops the same lookup table/dictionary. The next time the sending side sees a pattern that it has seen earlier, it will remove the pattern and replace it with a small token or symbol. The token is much smaller than the pattern it replaces. When the receiving side sees the token, it uses the dictionary it has developed to "translate" the token or symbol back into the unique bit pattern. The receiver then passes the restored information to the destination computer.

Ultra compression has also been referred to in the past as "A Protocol Independent Technique for Eliminating Redundant Network Traffic".

Although the term caching is often used in relation to ultra compression, ultra compression does not really hold a conventional cache. The cache in ultra compression involves keeping track of the recent history of a data stream. The data stream is not divided into objects and in most cases any objects involved in the stream are mixed in the history according to the time of arrival of each segment of the object. Such a mix prevents full object acceleration. It does however enable better compression of repeated patterns. Reference is made to FIG. 1, which illustrates a data stream 2 as it might appear on a network, then as how it would appear 4 in a conventional cache, and finally 6, as how it would appear in an ultra compression history cache.

Round-Trip Time Latency Management

End-to-end connection latency, or round-trip time, can have a profound effect on the effective throughput of an Internet connection. To ensure that all transmitted packets arrive at their destinations, transmission control protocols such as TCP have been developed to send acknowledgements when they successfully receive data packets. Only after the sender receives an acknowledgement signal from the receiver will the sender send more data. Therefore, the longer the round-trip time between two points, the longer it will take to send a file. An effect of this is that the greater the distance between two end points of a connection, the smaller is the available bandwidth for the connection. There are a few solutions available to mitigate the above problem:

TCP window size management
TCP slow start management
Forward error correction
Application protocol optimization Policy Based Multipath Routing Not all connections, or paths, across the Internet provide the same characteristics and different routes between the same two given points on the network can give two widely differing results. Some paths might have low latency, high throughput characteristics, while others may have high loss, high latency characteristics. Multipath routing enables data transmission of traffic with different requirements to travel via the most appropriate path across the network. As an example, delay-sensitive traffic can be routed across a more expensive low latency path, while e-mail traffic can be routed across a cheaper, lower throughput, higher latency path.

Low Bandwidth File System (LBFS)

Reference is now made to FIG. 2, which is a flow chart illustrating a file system known as LBFS for avoiding redundant transfer of data over low bandwidth networks. LBFS is a network file system designed specifically for low-bandwidth networks, and is suitable for Office LANs and the like. To reduce its bandwidth requirements, LBFS exploits cross-file similarities. To exploit inter-file similarities, the LBFS file server divides the files it stores into chunks and indexes the chunks by hash value. The LBFS client similarly indexes a large persistent file cache. When transferring a file between the client and server, LBFS identifies chunks of data that the recipient already has in other files and avoids transmitting the redundant data over the network. On both the client and server, LBFS is set to index a set of files to recognize data chunks it can avoid sending over the network. To save chunk transfers, LBFS relies on the collision resistant properties of the SHA-1 hash function. The probability of two inputs to SHA-1 producing the same output is far lower than the probability of hardware bit errors. Thus, LBFS follows the widely-accepted practice of assuming no hash collisions. If the client and server both have data chunks producing the same SHA-1 hash, they assume the two are really the same chunk and avoid transferring its contents over the network.

LBFS operates in a similar way to some peer to peer implementations with one particular additional feature, it adds a file cache. The file cache temporarily stores files at a given location and enables clients not to request files or segments of files from across the network that are in fact already in the cache and have not been altered in the meantime.

LBFS has the following aspects:

LBFS is implemented as a specific protocol modification. It is not a universal solution for all object transfer problems.

The LBFS method relies on obtaining specific protocol information for the method to operate, namely the file path. It does not implement a caching system that is based only on the object information itself.

LBFS applies a query level method, that is it interferes in the object query to achieve its goals.

LBFS applies a content aware method. The client cache is aware of the type of information it holds. This is a disadvantage, because service providers do not want to be held responsible for the data they transfer. A suitable method should therefore be data unaware.

LBFS does not enable utilization of network paths different from the network paths that leads from the sender to the receiver. That is to say it only operates on what data is sent, not how it is sent.

LBFS does not enable reduction in transfer time in those cases where the object does not exist in the target object cache.

LBFS does not enable distribution of network load between the network paths leading from the sender to the receiver and other network paths.

LBFS requires modification of the clients and servers to enable traffic optimization.

LBFS is vulnerable to false cache hits. As LBFS relies solely on the digest message to determine a cache hit and different payloads can be represented by the same digest message, a false cache hit may occur and the wrong payload might be sent instead of the original payload.

P2P Object Identification

In several peer to peer protocols, cryptographic keys are used for object identification. All files are given a hash value. The hash value allows each user to find all sources to a particular file independently of any file name each user may have given the file, using the unique hash value. In addition, the files are broken into 9.28 MB data segments. Each segment is given its own hash value. For example a 600 MB file would contain 65 segments, each part receiving its own hash value. Then a hash value for the file as a whole is created from the part hashes, and the file identified by the hashes is ready to be used in the networks.

Duplicate Transfer Detection (DTD)

Duplicate Transfer Detection (DTD) is a system that allows any web cache to potentially eliminate all redundant HTTP payload transfers. DTD is a specific HTTP modification solution that adds a message digests field to the HTTP header to enable redundant HTTP transfer detection.

TABLE 1

DTD protocol Data Flow

```
Conventional URL-indexed cache
    if cache[URL] == correct payload
        conventional_payload_hit++
    else
        new_payload_miss_or_redundant_transfer++
        send URL
        receive payload
        cache[URL] := payload
"Frugal" cache
    if u_cache[URL] == correct payload
        conventional_payload_hit++
    else
        send URL
        receive payload digest
        if d_cache[digest] == correct payload
            redundant_transfer_avoided_hit++
            send "don't bother"
        else
            new_payload_miss++
            send "proceed"
            receive payload
            d_cache[digest] := payload
            u_cache[URL] := payload
```

| First client request: | Second client request: |
|---|---|
| HEAD /imagen/logo.gif | GET /images/logo.gif |
| HTTP/1.1 | HTTP/1.1 |
| Host: example.com | Host: example.com |
| Want-Digest: HD5 | Second server response: |
| First server response: | HTTP/1.1 200 OK |
| HTTP/1.1 200 OK | Date: Tue, 30 Jul 2002 |
| Date: Tue, 30 Jul 2002 | 16:30:06 GMT |
| 18:30:06 GMT | Digest: |
| Digout: | md6=HUXZLQLMuI/KZ6KDcJPcOA== |
| md5=HUXZLQLMuI/KZ5KDcJPcOA== | Cache-control: max-age=3800 |
| Cache-control: max-age=3800 | ETag: "xyzzy" |
| ETag: "xyzzy" | (message body omitted) |

The DTD protocol data flow is illustrated in table 1.

DTD is distinguished by the following aspects:

DTD is implemented as a specific protocol modification. It is not a universal solution for all object transfer problems.

The DTD method relies on obtaining specific protocol information for the method to operate, namely the URL.

It does not implement a caching system that relies only on the object information itself.

DTD applies a query level method, i.e. it interferes in the object query to achieve its goals.

DTD applies a content aware method. The client cache is aware of the type of information it holds. As mentioned above, this is a disadvantage.

DTD does not enable utilization of network paths different than the network paths that lead from the sender to the receiver.

DTD relies entirely on the internal cache of the proxy in question. It does not enable reduction in transfer time in those cases where the object does not exist in the target object cache.

DTD does not enable distribution of network load between the network paths leading from the sender to the receiver and other network paths.

DTD requires modification of web servers to enable traffic optimization.

DTD is vulnerable to false cache hits. As DTD relies solely on the digest message to determine a cache hit and different payloads can be represented by the same digest message, a false cache hit may occur and the wrong payload might be sent instead of the original payload.

Current Solutions Disadvantages

Basic Caching

Disadvantages to the Basic caching schemes are:

It is a solution mainly for web objects. It is not applicable for all digital objects.

It is a solution directed mainly at the World Wide Web or any other similar network that uses the hyper text transfer protocol (http). It is not applicable to all data communications network environments.

It is a solution that relies on a specific protocol parameter, e.g. an HTTP URL, and therefore it is not applicable to all digital object transfers regardless of their transfer context.

The fact that basic caching refers to a specific protocol parameter, e.g. an HTTP URL, makes it a content aware solution. This can lead to the network provider bearing legal responsibility for the content of the accelerated objects.

It does not enable utilization of network paths different from the network paths that lead from the sender to the receiver.

It does not enable reduction in transfer time also in cases where the object does not exist in the target object cache.

It does not enable distribution of network load between the network paths leading from the sender to the receiver and other network paths.

It does not guarantee that cached information is up to date.

It relies entirely on its internal cache. It does not provide traffic acceleration when the needed information is not placed in the internal cache. One of the symptoms of the above is low performance at startup time.

The fact that basic caching relies on a specific protocol parameter, e.g. an HTTP URL, prevents it from eliminating redundant data transmission with a non-matching protocol parameter, e.g. different URLs for the same file.

Packet Shaping

Packet shaping does not eliminate the redundant data transfers in the network. It merely eases the symptoms thereof.

Basic Compression

Basic compression schemes have the following disadvantages:

They do not eliminate the redundant data transfers in the network.

In most cases they do not enable acceleration of entire redundant objects. Reduction in transmission is achieved by compressing the redundant information instead of elimination.

It is a CPU intensive solution.

It is not beneficial for non-compressible objects. Many file types are already compressed.

It does not provide the minimal transfer latency for redundant transmission.

It does not enable utilization of network paths different from the network paths that lead from the sender to the receiver.

It does not enable distribution of network load between the network paths leading from the sender to the receiver and other network paths.

Ultra Compression

Ultra compression disadvantages are:

It does not eliminate the redundant data transfers in the network.

In most cases it does not enable acceleration of entire objects. Most of the time it does not receive the entire object and when it does it only tries to reduce the cost of the redundant transmission.

It is a CPU intensive solution.

It is not beneficial for non-compressible objects.

It does not provide the minimal transfer latency for redundant transmission.

It does not enable utilization of network paths different from the network paths that lead from the sender to the receiver.

It does not enable distribution of network load between the network paths leading from the sender to the receiver and other network paths.

It relies entirely on its internal cache. It does not provide traffic acceleration when the needed information is not placed in the internal cache. One of the symptoms of the above is low performance at startup time.

It relies on caching of network packets using a relatively small memory based cache, therefore it is limited to detecting and exploiting communication redundancies that are fairly localized in time.

It does not have information about the applications or servers that generate the (redundant) network traffic, therefore it has no ability to anticipate where data might be used and pre-stage that data in the far-end cache providing potential further acceleration and optimization of network traffic.

Round-Trip Time Latency Management

Round-Trip time latency management does not eliminate the redundant data transfers in the network. It merely attempts to ease the symptoms thereof.

Policy Based Multipath Routing

Policy-based multi-path routing does not eliminate the redundant data transfers in the network. It merely attempts to ease the symptoms thereof.

LBFS

Basic caching disadvantages are:

It is a solution only for files in an NFS file system. It is not applicable for all digital objects.

It is a solution directed only to NFS enabled environments.

It is not applicable for all data communications network environments.

It is a solution that relays on specific NFS file path information and therefor it is not applicable to all digital object transfer regardless of their transfer context.

The fact that LBFS refers to the NFS file path makes it a content aware solution. This can lead to bearing legal responsibility for the content of the accelerated objects.

It does not enable utilization of network paths different from the network paths that lead from the sender to the receiver.

It does not enable reduction in transfer time in those cases where the object does not exist in the target object cache.

It does not enable distribution of network load between the network paths leading from the sender to the receiver and other network paths.

It requires modification of the clients and servers to enable traffic optimization.

LBFS is vulnerable to false cache hits. As LBFS relies solely on the digest message to determine a cache hit and different payloads can be represented by the same digest message, a false cache hit may occur and the wrong payload might be sent instead of the original payload.

P2P Object Identification

P2P Object Identification does not eliminate the redundant data transfers in the network.

DTD Disadvantages

DTD disadvantages are:

It is a solution only for the HTTP protocol. It is not applicable for all digital objects.

It is not applicable for all data communications network environments.

It is a solution that relies on the specific URL path and therefore it is not applicable to all digital object transfer regardless of the transfer context.

The fact that DTD refers to the URL makes it a content aware solution. This can lead to bearing legal responsibility for the content of the accelerated objects.

It does not enable utilization of network paths different from the network paths that lead from the sender to the receiver.

It does not enable reduction in transfer time in those cases where the object does not exist in the target object cache.

It does not enable distribution of network load between the network paths leading from the sender to the receiver and other network paths.

It requires modification of web servers to enable traffic optimization.

It enables optimization only for complete objects and cannot optimize partial objects DTD clients may need to apply some heuristics, such as not issuing the extra HEAD request on URLs containing an "?"

Certain Web servers may never send a digest. It is noted that HTTP servers are not required to send instance digests, and there is currently no mechanism to discover if a server would ever send one. The client could thus experience problems with respect to a given server, without ever gaining a benefit.

DTD is vulnerable to false cache hits. As DTD relies solely on the digest message to determine a cache hit and different payloads can be represented by the same digest message, a false cache hit may occur and the wrong payload might be sent instead of the original payload.

There is thus a widely recognized need for, and it would be highly advantageous to have, a network data transfer system devoid of the above limitations.

SUMMARY OF THE INVENTION

According to one aspect of the present invention there is provided apparatus for transferring data objects over a network, comprising:

at a sending locality on said network:

an interception unit for intercepting passing objects on the way to respective recipients; and an identification unit, associated with said interception unit for generating a digital network association for said passing object, said interception unit being configured to replace said passing object with said digital network association to pass over said network and further to use said digital network association to label said object in a dictionary; and a dictionary for storing said passing object in reference to said digital network association; and at a receiving locality on said network:

a search unit for searching for a corresponding object in at least one dictionary using said digital network association to identify said corresponding object, thereby to supply said corresponding object to a respective recipient from a relatively nearby dictionary without carrying out redundant network transfer; and an association authentication unit, associated with said search unit for managing association information and preventing false match between said digital network association to said data object.

Preferably, said search unit is configured to provide:

a) local searching, b) if said local searching is unsuccessful, then searching at a closest network node, and c) if said local searching is unsuccessful then continuing to search at successively distant network nodes.

Preferably, said digital network association is composed of a unique data identifier, a unique unit identifier, and a validity timestamp.

Preferably, said identification unit is configured to use a hashing function and a local reference number in order to generate said unique data identifier.

Preferably, said unique unit identifier is a predefined identifier set to represent the sending unit.

Preferably, said validity timestamp defines a minimal time frame in which the unique data identifier is associated with the data object on the sending unit.

Preferably, said hashing function is substantially injective.

Preferably, said dictionary enables retrieval of a data object when given a unique data identifier.

Preferably, said dictionary is configured to use a predefined algorithm, as "Least Recently Used" (LRU), in order to manage the replacement of dictionary entries.

Preferably, said association authentication unit stores said unique unit identification of the sending unit, local reference number of the object on the sending unit and said validity timestamp in association with said local unique data identifier in order to determine the validity of the stored association and in order to prevent false matches between data identifiers to data objects.

Preferably, copies of respective passing objects are stored at a plurality of nodes of said network, each in association with said respective unique identifier, such that said copy is retrievable from each node using said respective digital network association.

Preferably, distance of nodes is determined by networking parameters, and wherein said networking parameters comprise at least one of a group including: physical distance, bandwidth, roundtrip time, latency, number of routing hops and economical cost.

Preferably, said intercepting unit is configured to segment passing objects prior to caching, the apparatus further comprising a load balancing unit associated with said search unit, such that said load balancing unit is able to retrieve different segments of said object from different nodes of said network, thereby to provide relatively balanced network utilization.

The apparatus may comprise a content control unit configured to store unique identifiers relating to data objects whose distribution it is intended to control, together with rules for said control, such that said control unit can be searched using a given unique identifier to retrieve a corresponding rule to be applied to further distribution of said object.

Preferably, said rule is any one of a group comprising transfer blockage, object altering, and object replacement.

Preferably, said sending locality further comprises a receiving locality identification unit configured to identify a system component at said receiving locality by sending an ICMP message to said recipient, and allowing a response to said ICMP message to be recognized and altered by said system component, thereby to identify said system component as a component at said receiving locality.

Preferably, said sending locality further comprises a receiving locality identification unit configured to identify a closest system component to said recipient by sending an ICMP message to said recipient, and allowing a response to said ICMP message to be recognized and altered by a first system component that said response passes, thereby to identify said system component as a closest system component to said recipient.

According to a second aspect of the present invention there is provided a method of transferring data objects over a network, comprising:

At a sending locality on said network:
intercepting passing objects on the way to respective recipients;
generating a digital network association for segment of said passing data,
replacing said passing data segment with said digital network association to pass over said network, and
using said digital network association to label said data segment in a dictionary; and
at a receiving locality on said network:
searching for a corresponding object in at least one dictionary using said digital network association to identify said corresponding object, thereby to supply said corresponding object to a respective recipient from a relatively nearby dictionary without carrying out redundant network transfer.

Preferably, said searching is initially carried out locally, then at a node close to said intended recipient and if a corresponding object is still not found then expanding said search to steadily more distant nodes.

The method may comprise segmenting said passing objects to predetermined sizes before said storing in dictionaries and before said creating a digital network association.

Preferably, distance of nodes is determined using networking parameters comprising at least one of a group including physical distance, bandwidth, roundtrip time, latency, number of routing hops and economical cost.

Preferably, said searching is carried out at a plurality of nodes on different paths to said intended recipient, thereby to ensure relative network usage balance.

According to a third aspect of the present invention there is provided a node of a communication network configured to minimize redundant object transfer over said network, the node comprising:
an interception unit for intercepting network communications carrying data objects;
a dictionary for storing said data objects;
a labeling unit associated with said dictionary, for
a) generating a digital network association of each data object stored in said dictionary, thereby providing each said data object with an electronic signature that in combination with a local reference number comprise a unique data identification;
b) storing a first copy of said unique data identification in association with said object; and
c) replacing said data object with a second copy of said unique data identification in said network communication to continue over said network; and
a retrieval unit associated with said dictionary, for
d) receiving a query for an object identified by a digital network association from said network,
e) comparing said electronic signature with stored signatures in said dictionary,
f) if a match is found and the stored data segment has a valid authentication from the sending unit then retrieving an object corresponding to said matched signature, and
g) if a match is not found then sending said query on to a neighboring node.

According to a fourth aspect of the present invention there is provided a dictionary, associated with a node of a communication network, said dictionary being configured to minimize redundant object transfer over said network, the dictio nary being capable to storing said data objects and further being associated with:
an interception unit for intercepting network communications;
a labeling unit associated with said dictionary, for
a) generating a digital network association of each data object stored in said dictionary, thereby providing each said data object with an electronic signature of the data segment, an identifier of the transmitting network node and a validity timestamp;
b) storing a first copy of said identifier in association with said object; and
c) replacing said data object with a second copy of said identifier in said network communication to continue over said network; and
a retrieval unit associated with said dictionary, for
d) receiving a query for a data object identified by a digital network association from said network,
e) comparing said electronic signature with stored signatures in said dictionary,
f) if a match is found and the stored data object has a valid authentication from the sending unit then retrieving an object corresponding to said matched signature, and
g) if a match is not found then sending said query on to a neighboring node.

According to a fifth aspect of the present invention there is provided a method of transferring data objects over a network comprising a plurality of nodes, comprising:
storing any passing object at a location relatively close to a sender,
generating a digital network association of said object;
storing said digital network association in association with said object in a dictionary;
sending said digital network association towards an intended recipient of said object;
at a node relatively close to said intended recipient using said sent digital network association to compare with identifiers of objects stored in said dictionary to find a match;
if a match is found and the stored object has a valid authentication from the sending unit then retrieving a corresponding stored object and sending to said intended recipient;
if no match is found then repeating said match at a further node, until a match is found.

Preferably, distance of a node is determined using networking parameters comprising at least one of a group including physical distance, bandwidth, roundtrip time, latency, number of routing hops and economic cost.

According to a sixth aspect of the present invention there is provided apparatus for remotely identifying over a network a system component closest to a given location, the apparatus comprising:
a message generator for generating a response request identifiable to respective system components, and
a sending unit for sending said response request to said given location such that said response request is received by said given location and a response is sent by return, said response being identifiable to said system components such that a first system component receiving said response identifies itself to said apparatus.

Preferably, said response request is an ICMP message comprising a first field having a first number and a second field having a second number being a predetermined function of said first number, said predetermined function being used by said system components to identify said response.

According to a seventh aspect of the present invention there is provided a method for remotely identifying over a network a system component closest to a given location, the method comprising:

generating a response request identifiable to respective system components, sending said response request to said given location such that said response request is received by said given location and a response is sent by return, said response being identifiable to said system components such that a first system component receiving said response identifies itself.

The method preferably comprises generating said response request comprises inserting into said response request a first number and a second number being a predetermined function of said first number, said predetermined function enabling said system components to identify said response.

According to a further aspect of the present invention there is provided apparatus for finding a closest neighboring destination node to a receiving locality, wherein a sending locality further comprises a receiving locality identification unit configured to identify a system component at said receiving locality by sending an ICMP message to said recipient, and allowing a response to said ICMP message to be recognized and altered by said system component, thereby to identify said system component as a component at said receiving locality.

According to a yet further aspect of the present invention there is provided apparatus for finding a closest receiving locality to a sending locality, wherein said sending locality further comprises a receiving locality identification unit configured to identify a closest system component to said recipient by sending an ICMP message to said recipient, and allowing a response to said ICMP message to be recognized and altered by a first system component that said response passes, thereby to identify said system component as a closest system component to said recipient.

According to a further aspect of the present invention there is provided a method for finding a closest neighboring destination node to a receiving locality, the method comprising:

identifying a system component at said receiving locality by sending an ICMP message to said recipient, recognizing a response to said ICMP message, and altering a response to said ICMP message, thereby to identify said system component as a component at said receiving locality.

According to a yet further aspect of the present invention there is provided a method for finding a closest receiving locality to a sending locality, the method comprising:

identifying a closest system component to said recipient by sending an ICMP message to said recipient, and allowing a response to said ICMP message to be recognized and altered by a first system component that said response passes, thereby to identify said system component as a closest system component to said recipient.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

In the drawings:

FIG. 21 is a simplified diagram illustrating data flows in the prior art duplicate transfer detection DTD;

FIG. 24 is a simplified diagram illustrating the used fields in an ICMP header for the method of detection of remote network node at a close proximity to a recipient

DESCRIPTION OF THE PREFERRED EMBODIMENTS

Figure 1:
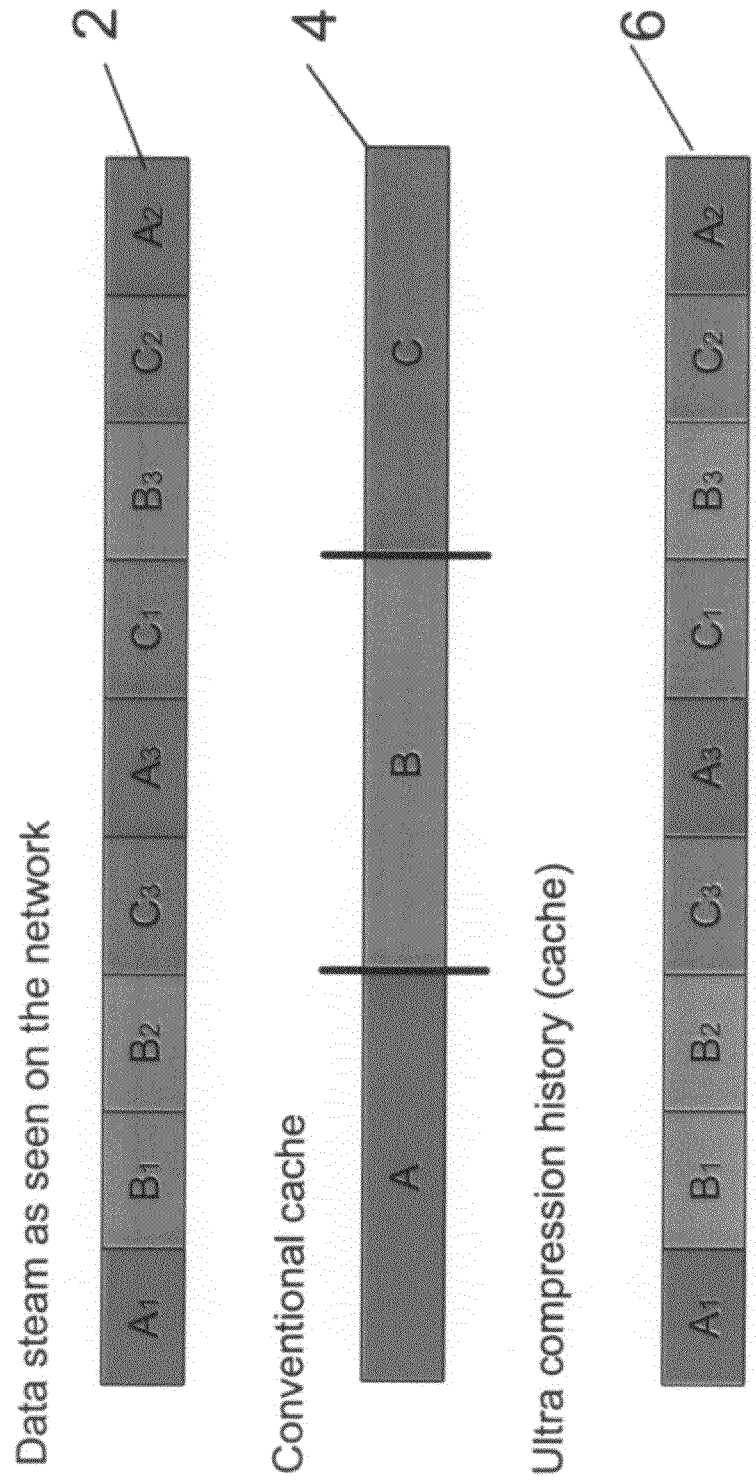
FIG. 1 is a simplified diagram showing a comparison between regular caching and ultra-compression caching, both being prior art to the present invention.
Figure 2:
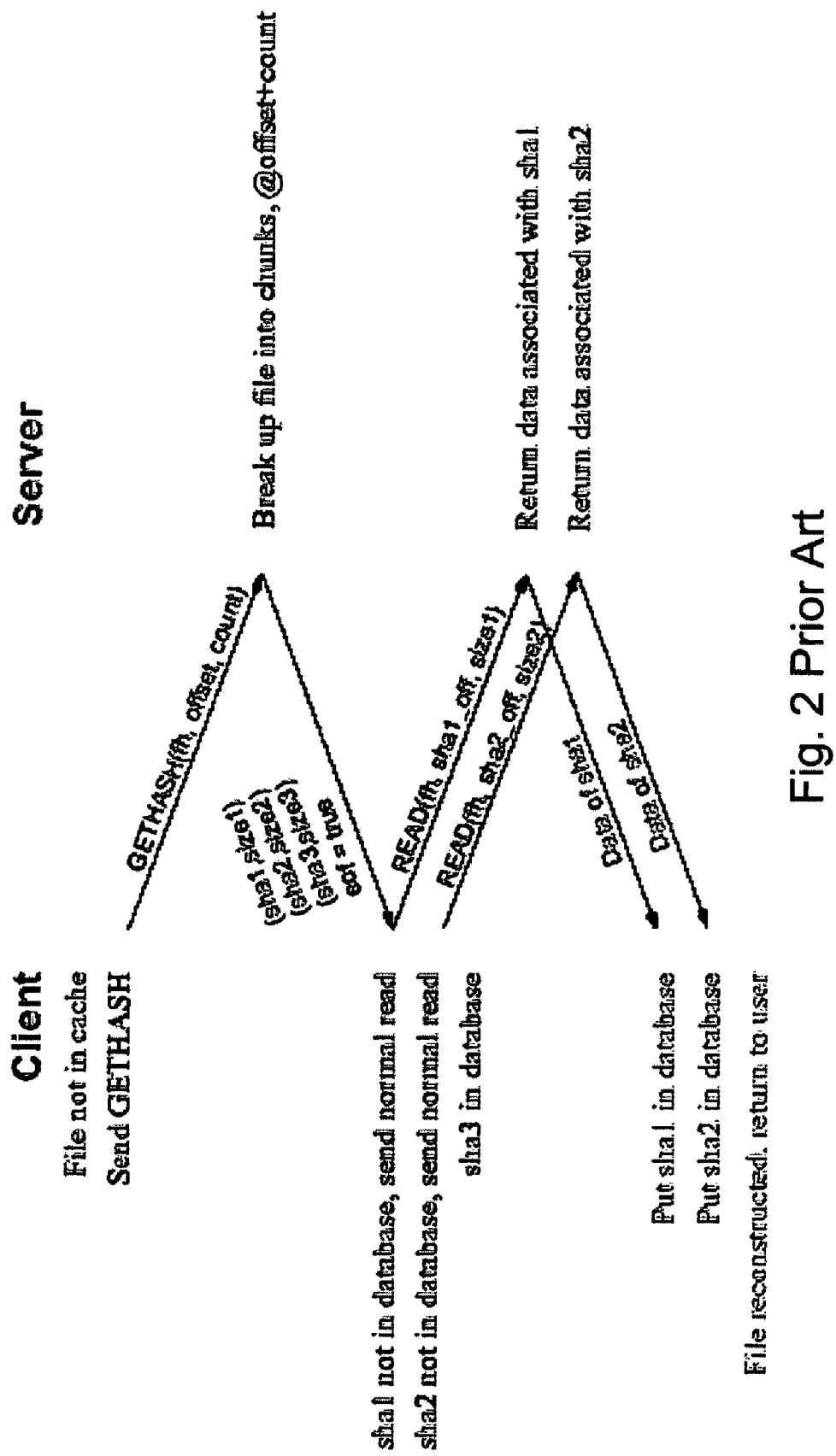
FIG. 2 is a simplified diagram illustrating data flows in the prior art low bandwidth file system LBFS.

The present embodiments comprise a network wide bidirectional data transfer optimization system that stores objects or parts of objects in dictionaries at nodes on a network and uses unique identifiers to find the stored object in such dictionaries.

The term "dictionary" is used herein to refer to the stores in which objects are cached at the different nodes. The same identifier always produces the same result at all nodes, just as a word looked up in a dictionary always produces the same result.

Objects passing over the network are intercepted and replaced with the unique identifiers. The unique identifier is then used at the receiving end to identify the nearest copy of the object.

From an alternative point of view, a method is provided of transferring data objects over a network. The method comprises intercepting passing object, creating a unique identifier for the object using a predetermined function joint with authentication information of the sending entity, the same function having been used to provide identifiers for objects stored in network nodes at other nodes of the network and sending the unique identifier in place of the data segment.

Then, at the recipient end it is possible to obtain the unique identifier and use it as a key to search for a corresponding object in the local dictionaries. The search starts with a dictionary closest to the recipient and steadily spreads outwards. The object when found is sent for the benefit of the recipient and network bandwidth is saved by the avoidance of redundant transfer since the object is brought to the recipient from the network node which is the closest to him.

The system is intended to enable the following:

It minimizes redundant data transfer.

It is equally applicable to all kinds of digital objects, where a digital object is any set of bits with a defined beginning and a defined end, including, but not limited to files or any segment of a file, packets or any segment of a packet, messages or any segment of a message, header or any segment of a header, sectors or any segment of a sector, web pages or any segment of a web page, records or any segment of a record as well as to any combinations thereof.

It is equally applicable to all kinds of data communications network environments including, but not limited to wireless networks, internet networks, satellite networks, digital RF networks, cellular networks, and cable networks including digital content delivery.

It is preferably applicable to all digital object transfer methods, protocols and systems regardless of their transfer context. It preferably enables elimination of redundant transfers regardless of external properties including, but not limited to the sending protocol, the sending media, object name, object path, object description, and object reference.

It preferably enables acceleration of entire objects regardless of the order and manner that the segments are passed on the network and regardless of the mix with other objects and information during transfer on the data network.

It is a non content aware solution. It should enable delivery of a redundancy elimination solution without exposing the provider to any legal responsibility for the content that is accelerated by it.

It is preferably a non CPU intensive solution.

It is preferably beneficial both for compressible and non-compressible data.

It preferably enables minimal transfer time for redundant traffic.

It preferably enables utilization of network paths different from the network paths that lead from the sender to the receiver.

It should enable reduction in transfer time even in those more difficult cases where the object does not exist in the local storage.

It preferably enables distribution of network load between the network paths leading from the sender to the receiver and other network paths.

It does not rely entirely on its own internal local storage. It preferably provides traffic acceleration even when the needed information is not placed in the node's local storage but placed in neighboring devices and even distant devices.

It enables network content control without any privacy issues being raised and without actually being a content aware solution, i.e. it does not affect the transferred content without additional external information. The external information that is required enables a simple match and still does not enable the identification of the true content.

It enables dynamic alteration of the content based on configuration e.g. request for a dvd movie in Israel will result in a region 3 coding while a request for the same dvd from the US will result in a region 1 coding.

It enables detection of a remote network node at a close proximity to the recipient end.

It is not vulnerable to false matches between data identifiers to objects.

The principles and operation of a data transfer and control system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 3:
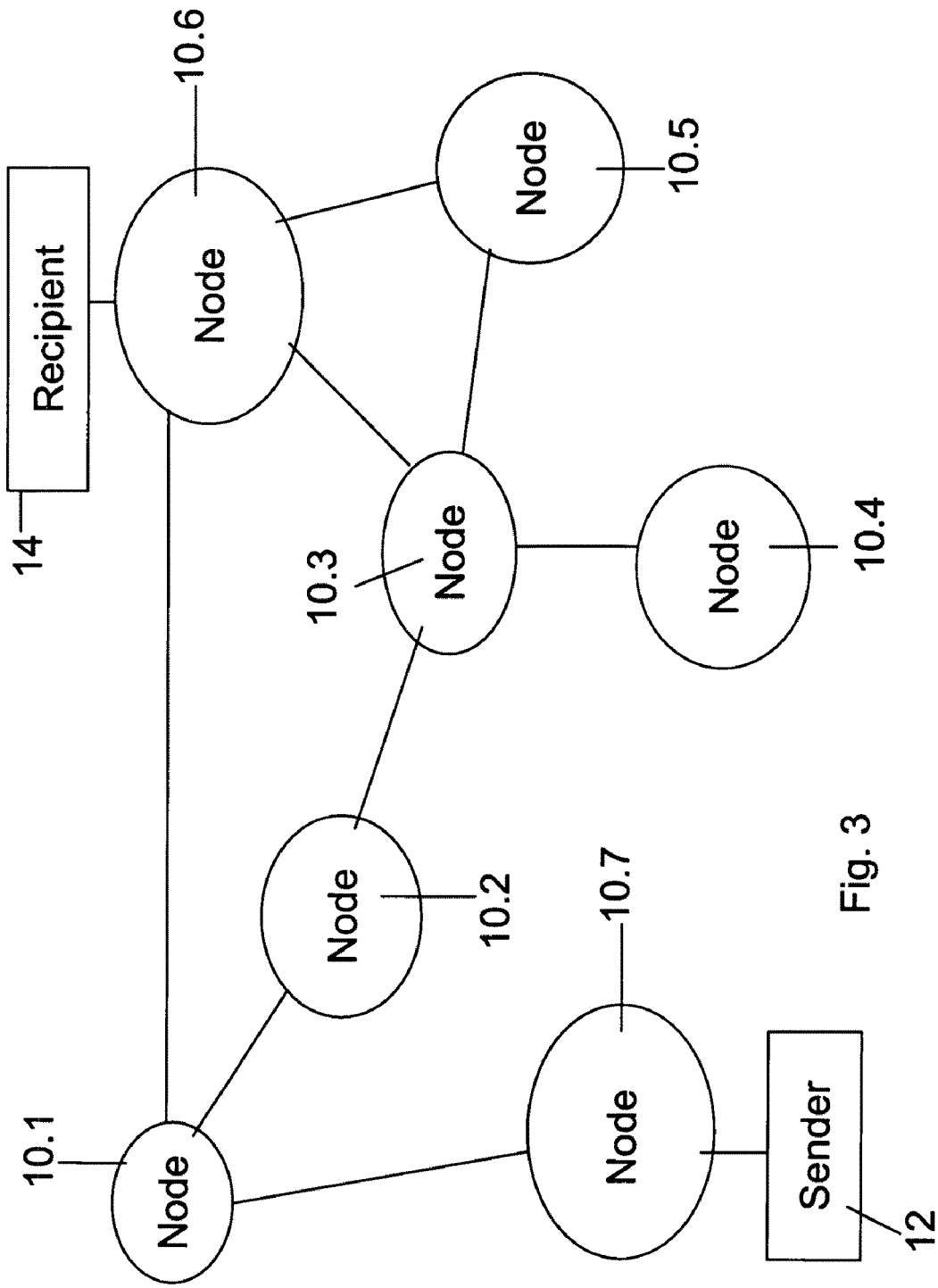
FIG. 3 is a simplified diagram illustrating a typical network comprising a plurality of nodes on which an object transfer acceleration system according to the present invention would be beneficial.

Reference is now made to FIG. 3, which illustrates an exemplary network having a large number of nodes 10.1 ... 10*n* linked by connections. A sender 12 lies in association with a certain node at one end of the network, and a recipient 14 lies in association with a certain node elsewhere on the network. There are a number of possible paths from the sender to the recipient and conventionally packets carrying objects directed from the sender to the recipient are sent via one or more of these possible paths using up bandwidth over all the intervening connections of the paths selected. Packets are routed independently so that in practice bandwidth is used up over several of the routes. However, as mentioned above, many of the objects being sent over the network, such as images embedded into popular webpages, are being sent over and over again. Network caching solutions exist but are not comprehensive.

Figure 4:
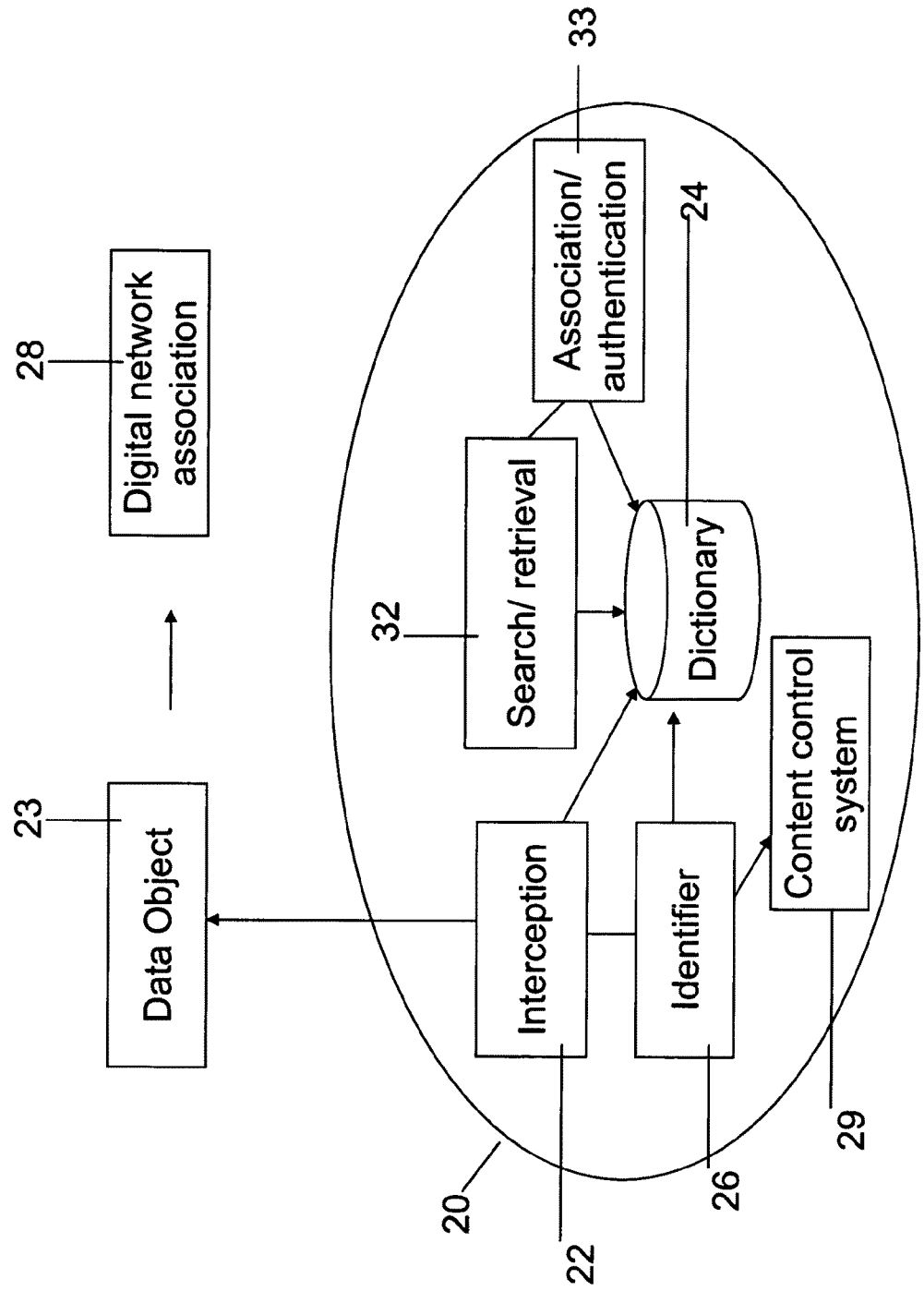
FIG. 4 is a simplified diagram illustrating a network node according to a preferred embodiment of the present invention in the process of intercepting an object from the sender.

Reference is now made to FIG. 4 which illustrates a network node in accordance with a preferred embodiment of the present invention. The node is part of a network wide system for transferring objects over a network. The system is designed to control transfer of digital content and to ensure that objects sent repeatedly about the network are stored at strategic locations and are rendered easily identifiable for retrieval by being provided with an electronic signature. A notification to the recipient concerning the object carries the signature and enables retrieval of the object from the dictionary closest to the recipient, irrespective of where the object is sent from. Thus the object is only sent over the minimal necessary distance over the network, where proximity is defined by networking parameters including, but not limited to physical distance, bandwidth, roundtrip time, latency, number of routing hops or by economical cost or by any other beneficial parameter.

It will be appreciated that the system preferably continues to work during the retrieval process so that if the object is only found at a relatively distant network node from the recipient then it is additionally stored at intermediate network nodes, with the overall result that widely used objects such as the images embedded in especially popular web pages are stored at many locations over the Internet.

In FIG. 4, node 20 comprises an interception unit 22 which intercepts a passing object 23 on the way to respective recipients and places them in dictionary 24. Associated with the interception unit 22 is an identification unit 26, which generates a digital network association 28 for the object. The digital network association is made of a unique data identifier, a unique unit identifier and a validation timestamp. The unique data identifier is preferably a function of all of the bits of the object, as per the definitions of hashing functions mentioned in the background, in order to reduce the chance of mismatch between identifiers and objects. In a preferred embodiment, the identification unit 26 is configured to use an hashing function in order to generate an electronic signature which can be used with a local reference number as the unique data identifier. Injective means that the function is one on one, that is to say the same output must have been produced by the same input. In practice the property of being injective is something of an ideal and there is a very small probability that certain outputs could have been produced by more than one input. Such a probability for an effective hashing function is certainly very much less than 0.5%, and terms herein such as injective or substantially injective are to be construed accordingly.

To create an injective function the unique unit identifier and reference number are attached to the outcome of the hashing function and create a unique identifier for that specific network node. On the specific network node, if the hashing function generates an already existing electronic signature, the object represented by that electronic signature is then compared to every previous object with the same electronic signature that is stored on the local dictionary, if the object is not found within the existing objects it may be given a new unique reference number. If the object was found to be the same as one of the existing objects, it may be given the unique reference number of the object it was found to be the same as.

The requirements for such an electronic signature are described in greater detail hereinbelow. The digital network association 28 is then used as a reference to search in the content control system 29. If the digital network association 28, is found in the content control system the configured content control action is then performed on the object, where content control actions include, but are not limited to transfer blockage, object altering, and object replacement. The interception unit 22 replaces the passing object 23 with the digital network association 28, so that the identifier now takes the place of the object for the continuation of its journey over the Internet. The digital network association 28 is also used to label the object 23 in the dictionary 24 for future retrieval.

The node also preferably includes a search and retrieval unit 32 which is able to use such a digital network association message to retrieve an object stored in the dictionary 24 and a association authentication unit 33 which is able to validate that the retrieved object is indeed an exact copy of the sent object.

In use, object 23 is sent over the network from sender 12, and reaches node 20. At node 20 the object 23 is stored in a dictionary 24. A digital network association message 28 is generated for the object. The digital network association is also used to index the object in the dictionary. The digital network association message is now sent on its way over the network.

Figure 5:
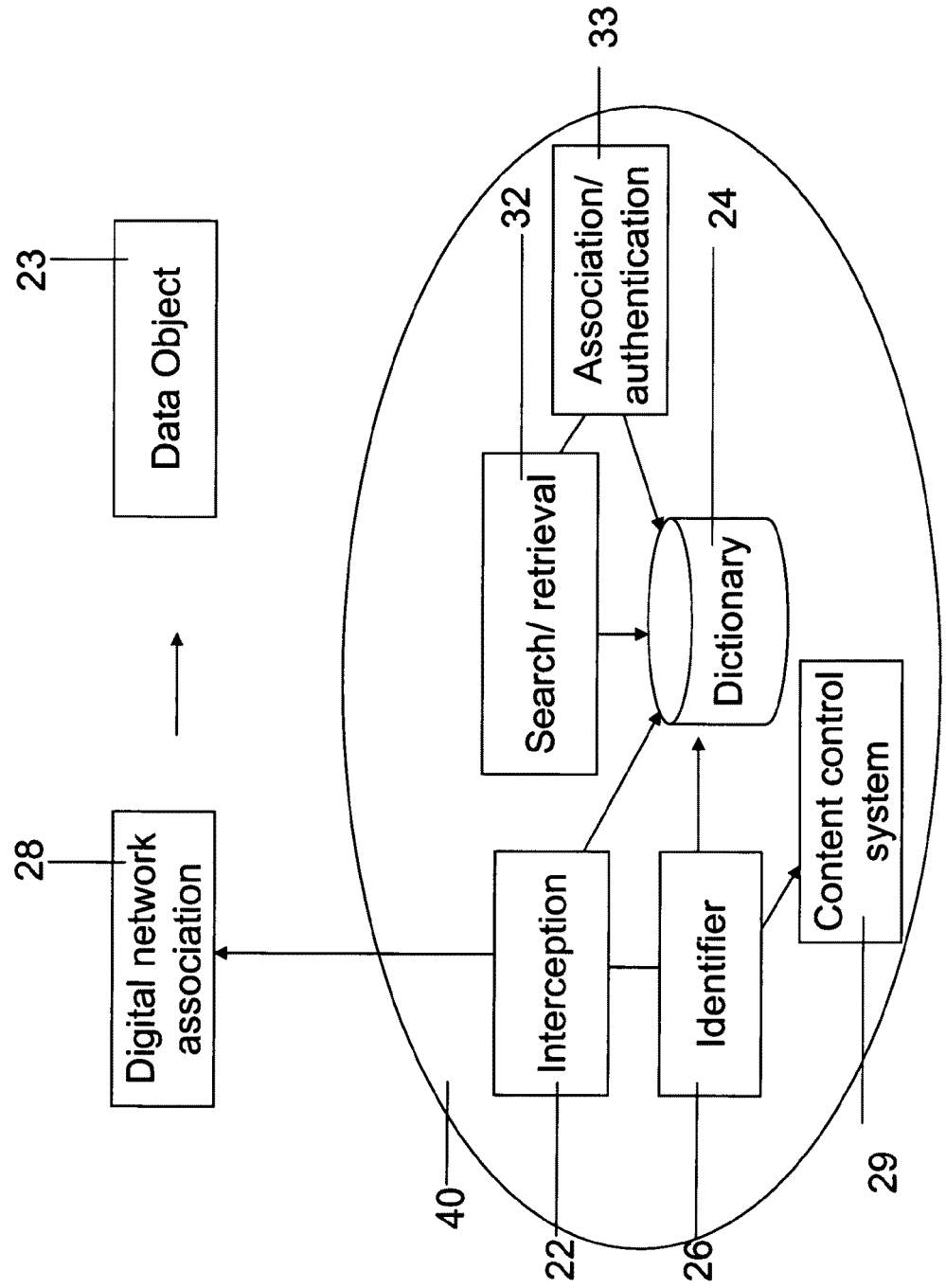
FIG. 5 is a simplified diagram illustrating the network node of FIG. 4, this time intercepting a digital network association which needs to be reconstructed before being sent on to the recipient.

Reference is now made to FIG. 5, which is the same as FIG. 4, except that it illustrates the processing of the digital network association message at a node 40 which is close to the intended recipient 14 of the object 23. The node is preferably the same as that in FIG. 4, at least in respect of caching of passing objects, and parts that are the same as in FIG. 4 are given the same reference numerals and are not referred to again except as necessary for understanding the present embodiment.

Digital network association 28 arrives at node 40. Thus instead of sending on the packets as normal the associated association authentication unit 33 converts the unique data identifier into a local data identifier which is used by the search unit 32 as a reference to search the content control system. After all needed control action has been performed, the search unit 32 uses the unique data identifier as a reference to search the dictionary 24. If object 23, corresponding to the unique data identifier, is found in the dictionary it is attached to the message and the message is sent onwards to the intended recipient.

If object 23 is not found in the dictionary at node 40, then a query is sent in the direction of surrounding nodes to attempt to trace the object. If the object is found in one of these nodes then again it is sent on to the recipient. However, preferably the object is also learned at dictionaries in intervening nodes, as will be explained in greater detail below, so that the availability of the object over the network is increased. In this way the system ensures that widely used objects are widely available over the network.

Figure 6:
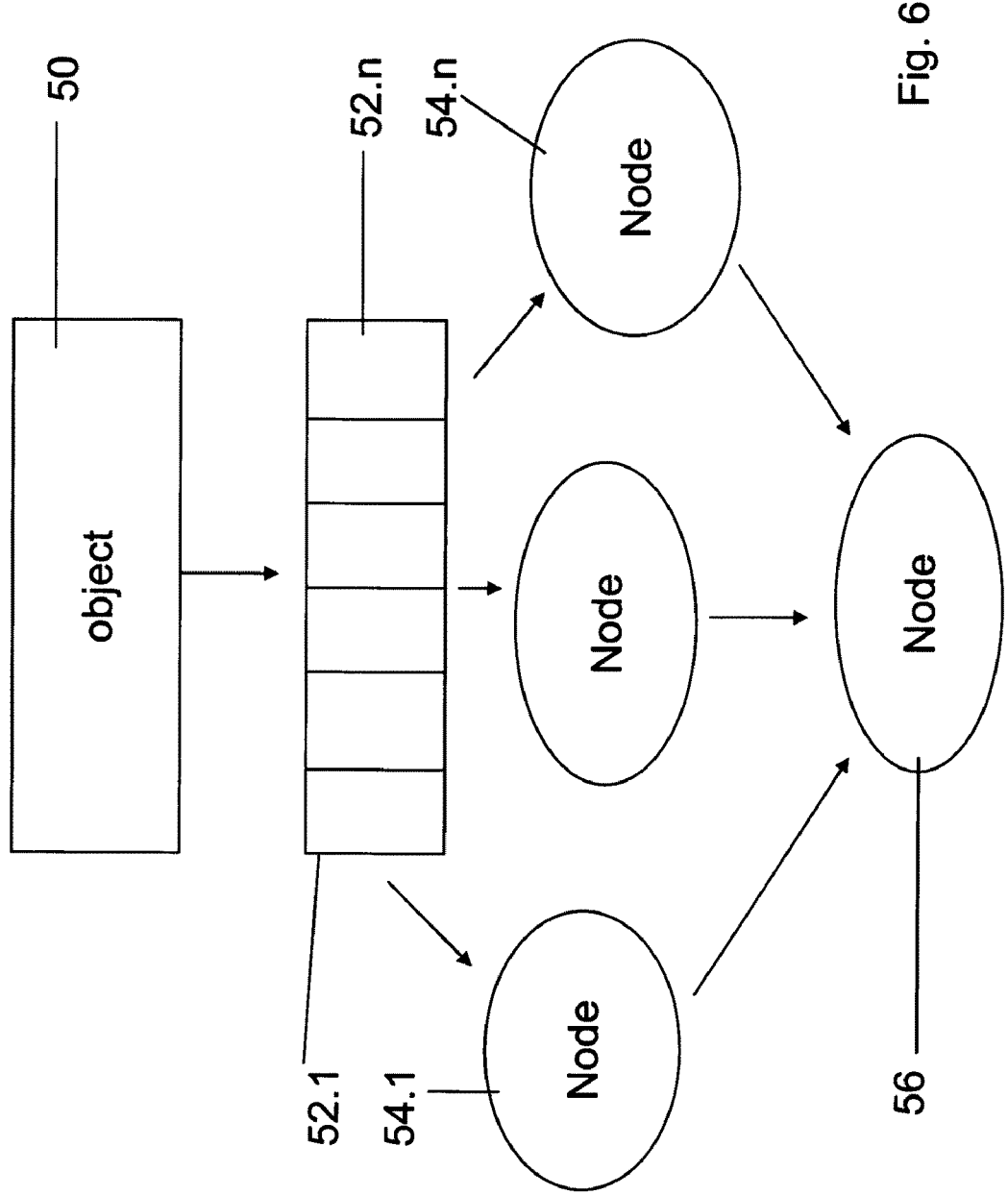
FIG. 6 is a simplified schematic diagram illustrating the network node of FIG. 4 segmenting an object in order to process it in segments.

Reference is now made to FIG. 6, which is a simplified diagram illustrating the process of storing and transmission of a large object, according to a further preferred embodiment of the present invention. As long as the objects are relatively small, the above process works satisfactorily since, even if the object is found at a relatively distant network node from the recipient, it can be sent to the recipient without undue overloading of the network connections. In any event, as long as the network node on which the object has been found is nearer than the sender's node, then network bandwidth has been saved. However if the object is large, then even if the object is sent from a closer node, considerable bandwidth is used up on that connection. Furthermore, sending the object in one piece means that a single path has to be used for the entire transfer. In fact it is more efficient to parcel the object into multiple packets and send each packet by a different route. That is to say it is preferable to attempt parallel usage of several distinct connections and nodes. Thus, in FIG. 6 the relatively large object 50 is segmented prior to labeling and inserting into the dictionary. The segments 52 are preferably of a predetermined size that is selected for uniformity throughout the network. Each segment is supplied with its own identifier and inserted into the dictionary as a separate unit. During the course of operation the segments become distributed over numerous network nodes 54.1 . . . 54.$n$. Subsequently, the separate segments are searched for and retrieved separately, with the emphasis placed on retrieving the different segments from as many different network nodes over different connections as possible to recipient's node 56. Hence it is possible to achieve balanced loading of the network connections.

Figure 7:
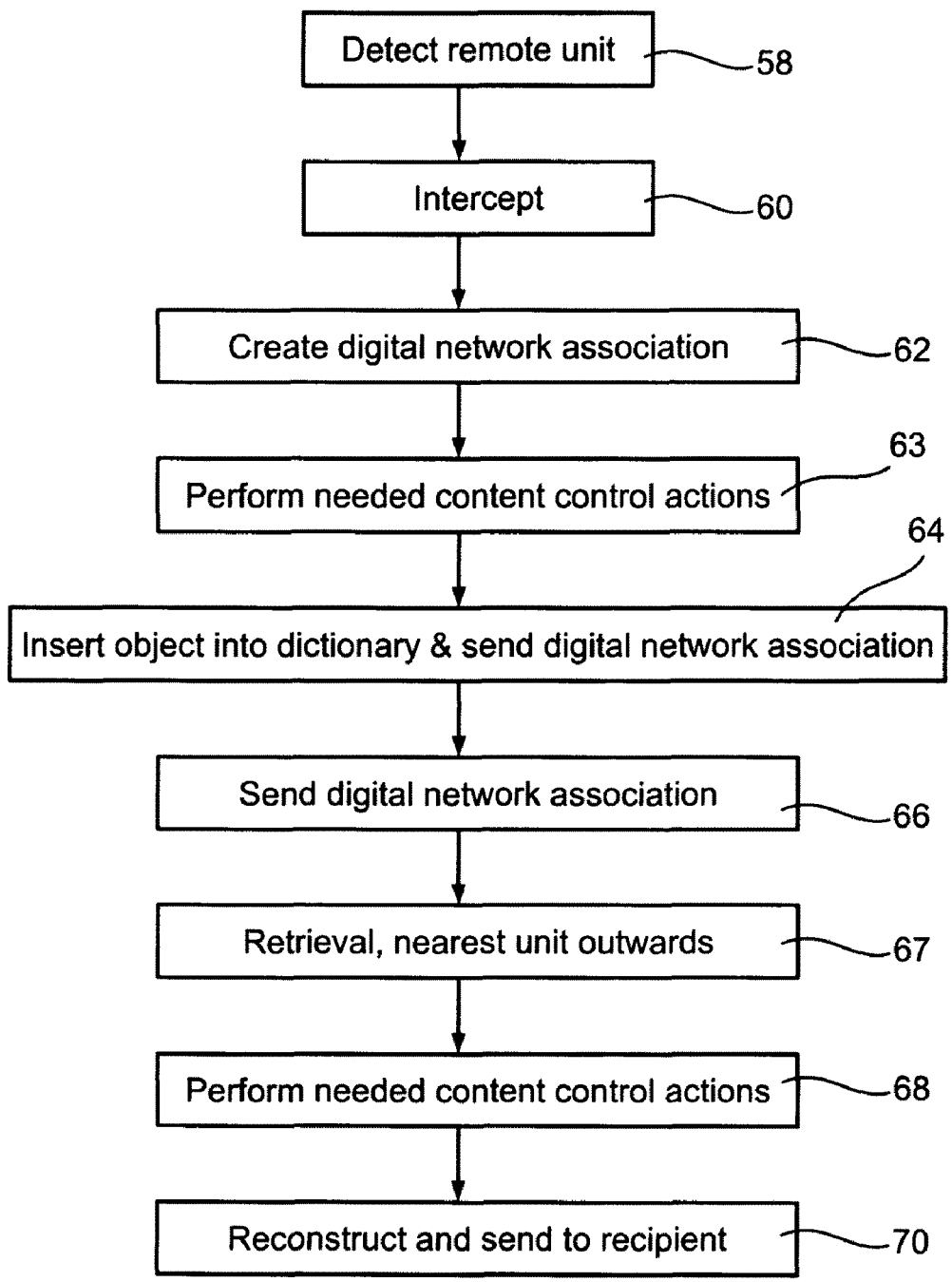
FIG. 7 is a simplified flow chart illustrating the procedure of sending and receiving a network object using acceleration according to a preferred embodiment of the present invention.

Reference is now made to FIG. 7, which is a simplified flow chart illustrating a method of transferring data objects over a network. The method comprises a first stage 58 of detection of a remote network node at a close proximity to recipient end. Second stage 60 comprises intercepting an object meant to be transferred over the network from a sender to a receiver. The intercepted object is then passed in a stage 62 to an identification unit for creating of a unique digital network association, using a predetermined function as explained above. The function is any of a group of well-known functions for creating electronic signatures combined with the mentioned above unique node identifier and reference number. The same predetermined function has been used to provide identifiers for objects stored at other nodes of the network.

In a stage 63, the digital network association is used as a reference to search in the content control system. If the digital network association, is found in the content control system then the configured content control action is performed on the object. The content control actions include, but are not limited to transfer blockage, object altering and object replacement.

In a stage 64, the object is inserted into the dictionary.

In a stage 66 the digital network association is sent on its way over the network.

At a recipient end of the network the digital network association is then used in a retrieval stage 67 as a key to search for a corresponding object. Ideally the object is found at the recipient's closest node, but this will often not be the case. Thus the retrieval is extended to steadily more distant nodes until the object is found.

In a stage 68, the digital network association is used as a reference to search in the content control system. If the unique identifier is found in the content control system then the configured content control action is performed on the object. The content control actions include, but are not limited to transfer blockage, object altering and object replacement.

The object is than sent to an intended recipient in stage 70.

As explained above, the retrieval of a stream that has been segmented into several objects may be carried out by taking different segments from different nodes on different paths, thus ensuring relatively balanced usage of the network The preferred embodiments of the invention are now considered in greater detail. As explained there is provided a method of providing content control and acceleration of digital object transfer and at the same time bandwidth usage on the network is reduced. The method comprises a. Intercepting digital objects at a local digital object dictionary,
b. Creating a digital network association that contains object authentication and identification information using a mathematical hashing function of the intercepted objects,
c. Using the digital network association as a reference to search in the content control system. If the unique identifier is found in the content control system the configured content control action is then performed on the object,
d. inserting the intercepted objects into a dictionary,
e. Sending the above digital network association onwards over the network in place of the object and index for retrieving the stored object from the dictionary using the generated identification,
f. At the recipient end of the network the method continues by using the digital network association to search for a matching object in the remote dictionary.
g. If a matching object is not found a further attempt is made at retrieval by fetching the object from successively more distant neighboring network nodes. When fetching from the neighboring network nodes, then, as described above, a load balancing mode can be activated. The load balancing mode enables simultaneous fetching of stream segments from different network nodes. If no closer network node holds the object, the object will eventually be transferred from the sender's originating network node.
h. The method continues by using the digital network association as a reference to search in the content control system. If the unique identifier is found in the content control system the configured content control action is then performed on the object,
i. the corresponding object is transferred to the intended recipient from the remote dictionary.

DEFINITIONS

The following is a non-limiting glossary of terms used in this disclosure.

Digital object: any set of bits with a defined beginning and a defined end, including, but not limited to files or any segment of a file, packets or any segment of a packet, messages or any segment of a message, header or any segment of a header, web pages or any segment of a web page, sectors or any segment of a sector, records or any segment of a record and combinations thereof.

Network node: software and/or hardware implementing the object transfer method.

Data communications network: any type of network that transfers data including, but not limited to wireless networks, TCP/IP-based networks including the Internet as a whole, satellite networks, digital RF networks, cellular networks, cable networks that include digital content delivery.

Remote/local: a remote network node is closer to the digital object destination than a local network node. proximity is defined by networking parameters including, but not limited to physical distance, bandwidth, roundtrip time, latency, number of routing hops or by economic cost or by any other beneficial parameter.

Mathematical hashing function: an injective function, for all feasible and valid content objects, where each valid sequence of bits has only one hash representation including, but not limited to MD4, MD5, SHA1, SHA256, SHA384, SHA512. These are also referred to herein as electronic signatures and unique identifiers.

Object id creation: the digital object identification, which is created using the mathematical hashing function, is either learned from the network protocol, which is transferring the object, or calculated by the network node.

Object interception: intercepting digital objects during transfer at a given node, is carried out using either transparent or non-transparent methods which are known in the art.

Load balancing mode: In load balancing mode, object segments are fetched in the same way that an entire object is fetched. The load balancing mode enables simultaneous fetching of object segments from different nodes in order to enable more balanced utilization of network paths than that achieved by merely placing the entire load over the network paths that lead from the sender to the receiver.

Content control actions: content control actions include, but are not limited to transfer blockage, object altering, and object replacement.

Data Transfer Optimization Using Bi-Directional Object Transfer

Figure 8:
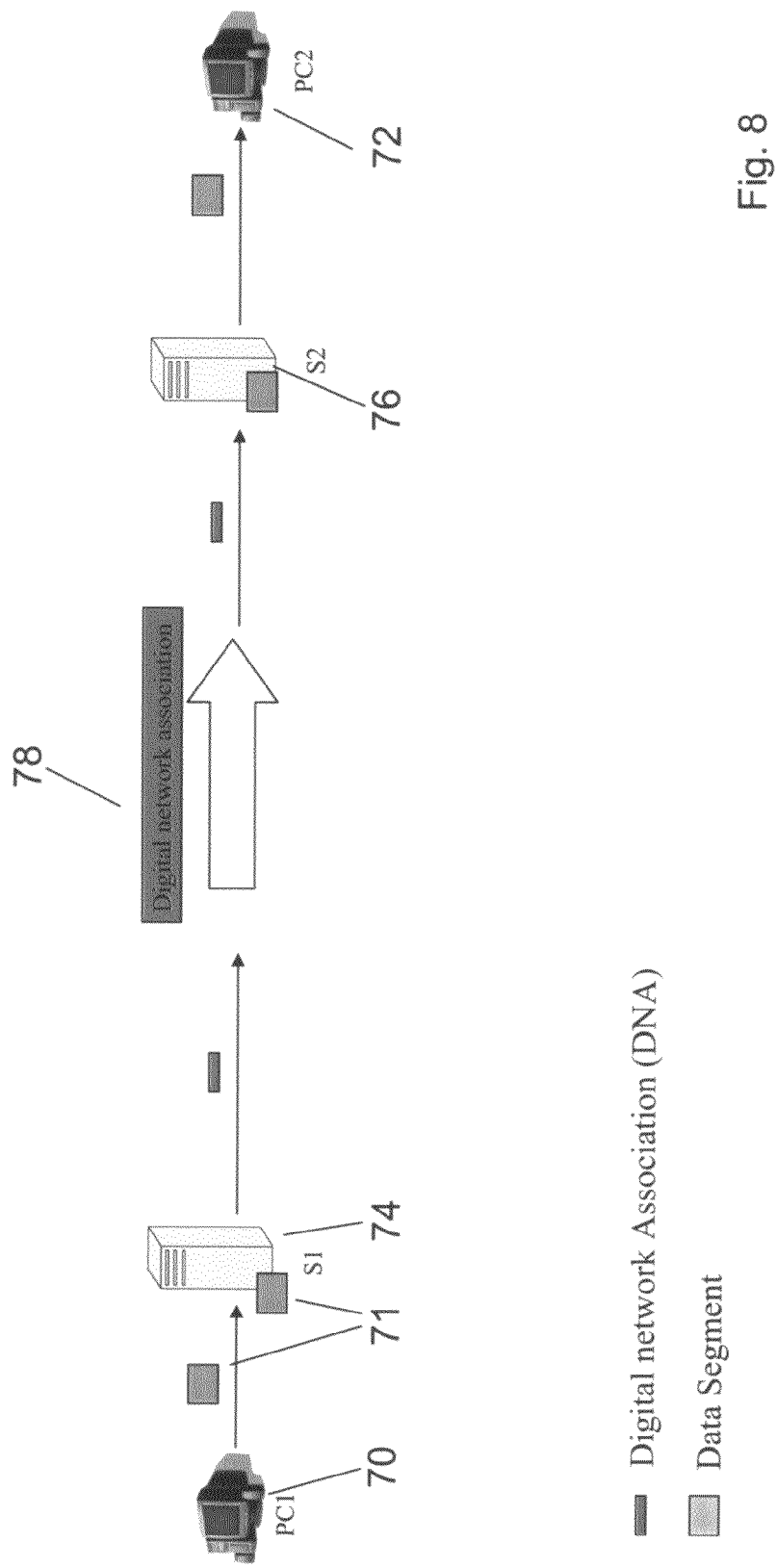
FIG. 8, is a simplified schematic diagram illustrating a first computer initiating transfer of an object to a second computer, according to a preferred embodiment of the present invention.

Reference is now made to FIG. 8, which is a simplified schematic diagram illustrating a first computer 70 initiating transfer of an object 71 to a second computer 72. Numerals 74 and 76 represent two network nodes, of which 74 is the local or sender's node and 76 is the recipient's or remote node.

The transfer process is accelerated as follows:
A. First computer 70 initiates an object transfer to second computer 72.
B. The local node 74 intercepts the digital object transfer. A digital network association 78 is generated for the object 71. The digital network association is composed of a unique data identifier, a unique unit identifier and validation timestamp. The unique data identifier is build of a local reference number and an electronic signature calculated using the output of a mathematical hashing function, e.g. SHA512.
C. Content control actions are performed on the object, using the unique data identifier as a reference to search in the content control system.
D. The intercepted object is stored in a local dictionary using the unique data identifier.
E. The local node 74 now sends the digital network association instead of the object itself.
F. The remote node 76 intercepts the altered transfer message. The digital network association is used to search for a corresponding local unique data identifier.
G. The remote node 76 performs content control actions on the object, using the local unique data identifier as a reference to search in the content control system.
H. The remote node 76 searches and validates the object in its dictionary using the local unique data identifier.
I. The object is then sent to its original destination.

Figure 9:
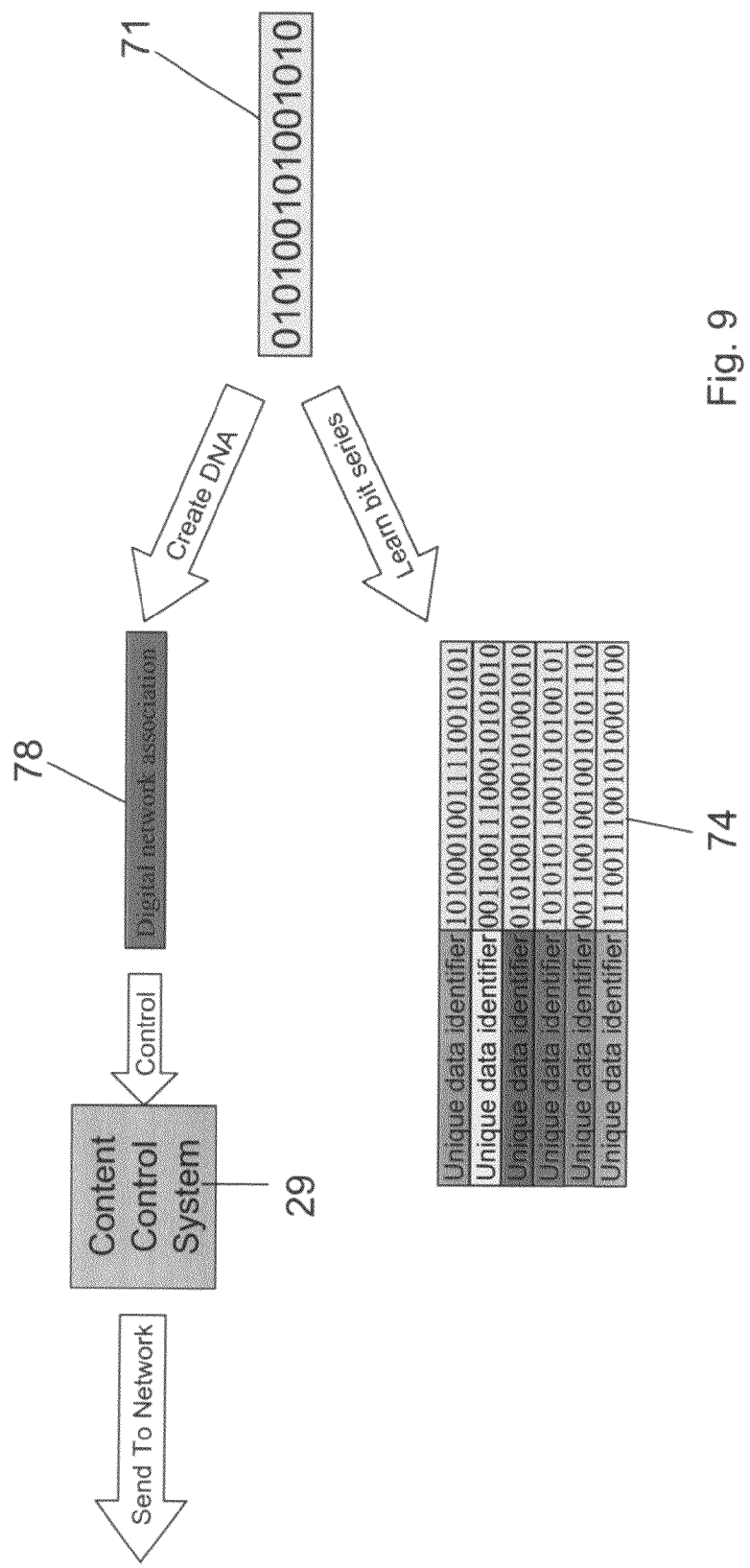
FIG. 9, illustrates a procedure at the local or sender's end node according to a preferred embodiment of the present invention.

Reference is now made to FIG. 9, which illustrates the procedure at the local or sender's end node 74. The local dictionary operates as follows:
A. The transfer of digital objects is intercepted. A digital network association 78 is generated for the object 71. The digital network association is composed of a unique data identifier, a unique unit identifier and validation timestamp. The unique data identifier is build of a local reference number and an electronic signature calculated using the output of a mathematical hashing function.
B. If the object is larger than a predetermined size, then the object is divided into segments. Then a digital network association is generated separately for each segment. The identification of the object as a whole becomes a concatenation of all of the identifications of the separate segments.
C. Content control actions are performed on the object, using the unique data identifier as a reference to search in the content control system.
D. The following stage involves storing of the digital object in the local dictionary, with the unique data identifier as a key.
E. The digital network association is now sent instead of the object itself.

Figure 10:
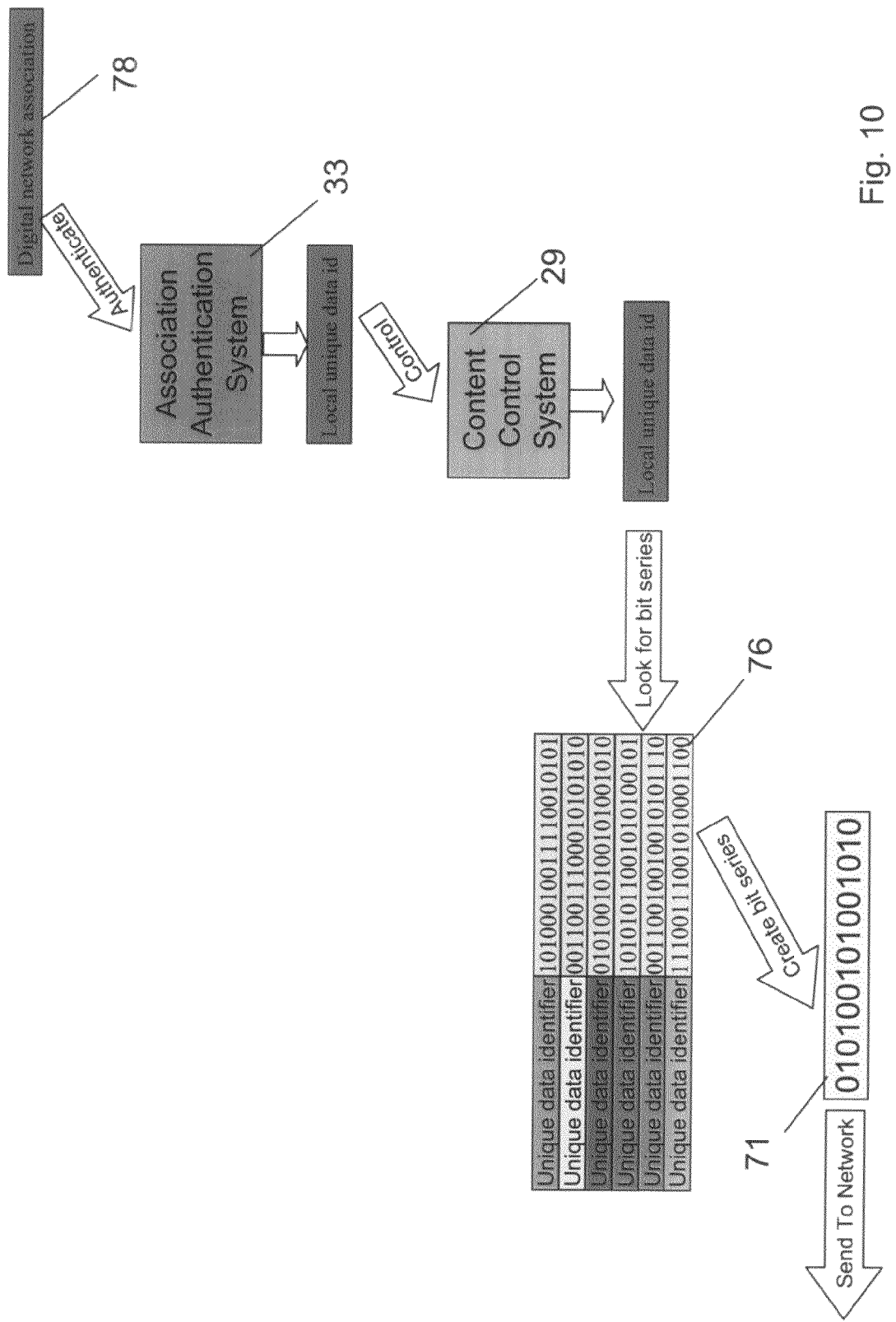
FIG. 10, is a simplified schematic diagram illustrating activity at the remote or receiving end node according to a preferred embodiment of the present invention.

Reference is now made to FIG. 10, which is a simplified schematic diagram illustrating activity at the remote or receiving end node 76.

The remote node carries out the following activities:
A. An interception is made of the transfer message that was altered at the local node 74. The digital network association is used to search for a corresponding local unique data identifier. The digital network association is composed of a unique data identifier, a unique unit identifier and validation timestamp. The unique data identifier is build of a local reference number and an electronic signature calculated using the output of a mathematical hashing function.
B. Content control actions are performed on the object, using the unique data identifier as a reference to search in the content control system.
C. The digital object 71 is searched and validated at the remote dictionary 76 using the local unique data identifier.
D. If the object 71 is found, then The object is then sent to its intended destination Reference is now made to FIG. 11, which is a simplified schematic diagram illustrating the case of object transfer with multiple network nodes.

Computer 70 initiates an object transfer to computer 72 via a network. The network comprises a plurality of network nodes S1, S2 . . . S10.

Optimization of the object transfer works as follows:
A. Computer 70 initiates the object transfer to computer 72. It sends a digital object, as before.

B. The local network node (S1) intercepts the digital object transfer. The intercepted object is stored in the local dictionary, and a digital network association is created 78 for the object.

C. Content control actions are performed on the object, using the unique identifier as a reference to search in the content control system.

D. The local network node (S1) then sends the digital network association 78 instead of the object itself.

E. The remote network node (S6) intercepts digital network association.

F. The remote network node uses the digital network association to validate and search for a corresponding local unique data identifier.

G. If the digital object is not found in the remote node dictionary, then the remote node tries to retrieve the object from any other digital node in and out of the object transfer path. Various options for implementing such retrieval algorithms are discussed below. The remote node generates a request for a network association message that is preferably composed of the unique association identifier given in the digital network association, the validity timestamp given in the digital network association and its unit id.

H. If the object is found in one of those network nodes, it is then sent to the requesting network node (S6) by using a reply for network association request message. The reply for network association request message is preferably composed of the original unique association identifier given in the request for network association message, the unique association identifier for the requested object on the replying unit, the validation timestamp on the replying unit and the data object itself. The replying unit uses the validity timestamp given in the request for network association message to update its association authentication database.

I. The requesting object node (S6) updates its association authentication database with the original association identifier and validity timestamp and the replying unit association identifier and validity timestamp.

J. Content control actions are performed on the object, using the local unique identifier as a reference to search in the content control system.

K. The output of the content control system is then sent onwards to the intended recipient.

Considering the above issues in greater detail first of all the question arises as to the best strategy to use for retrieving object parts when not found at the closest network node. There are numerous possible strategies that will suggest themselves to the skilled man as ways of solving this problem. One preferred strategy is to send a query message to all neighboring nodes. From the query it is established which nodes contain which parts of the object. After establishing which node has which part, then a request for each individual part is made to a particular node in such a way that overall the requests are balanced between the different nodes. Thus if five different nodes are found to contain the object, all being at substantially the same distance but on different paths, then the requests are distributed equally, each node being asked for one fifth of the parts. If two of the five nodes are for all practical purposes on the same path, and the system succeeds in determining this, then those two nodes may be treated as a single node and each of the four nodes including this double node, is asked for a quarter of the parts, and so on.

Another option would be to send the requests for the different parts sequentially.

Another option is to send requests for different segments of the object to different neighboring nodes.

Another option is to use a server node that maintains a global authentication database and can direct a request to a neighboring network node that contains the needed object while taking into account load balancing needs and other network parameters.

The preferred implementation contains a combination of some or all of the above strategies. In one particularly preferred embodiment, the knowledge available at the remote network node of the geographical layout of its neighboring nodes is used to determine the most effective choice of neighboring node.

Figure 11:
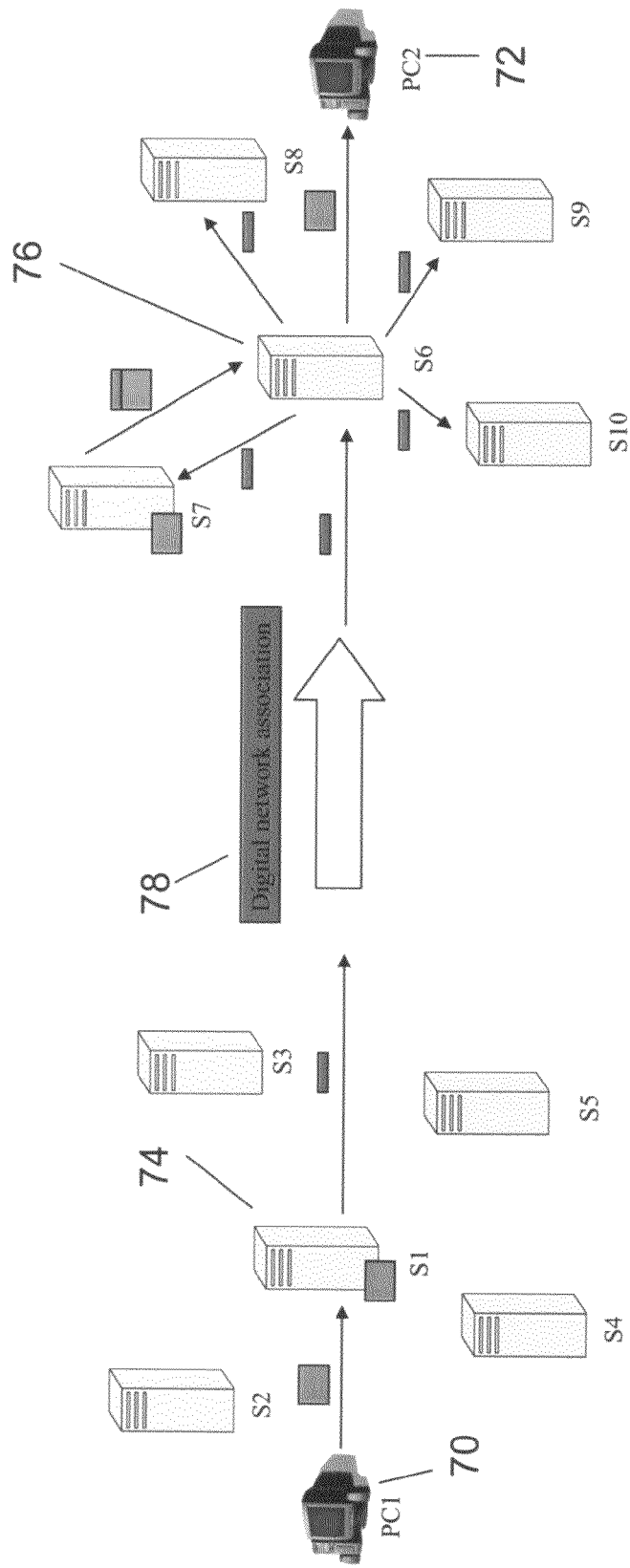
FIG. 11 is a simplified schematic diagram illustrating the case of Bi-Directional object transfer with multiple network nodes according to a preferred embodiment of the present invention.
Figure 12:
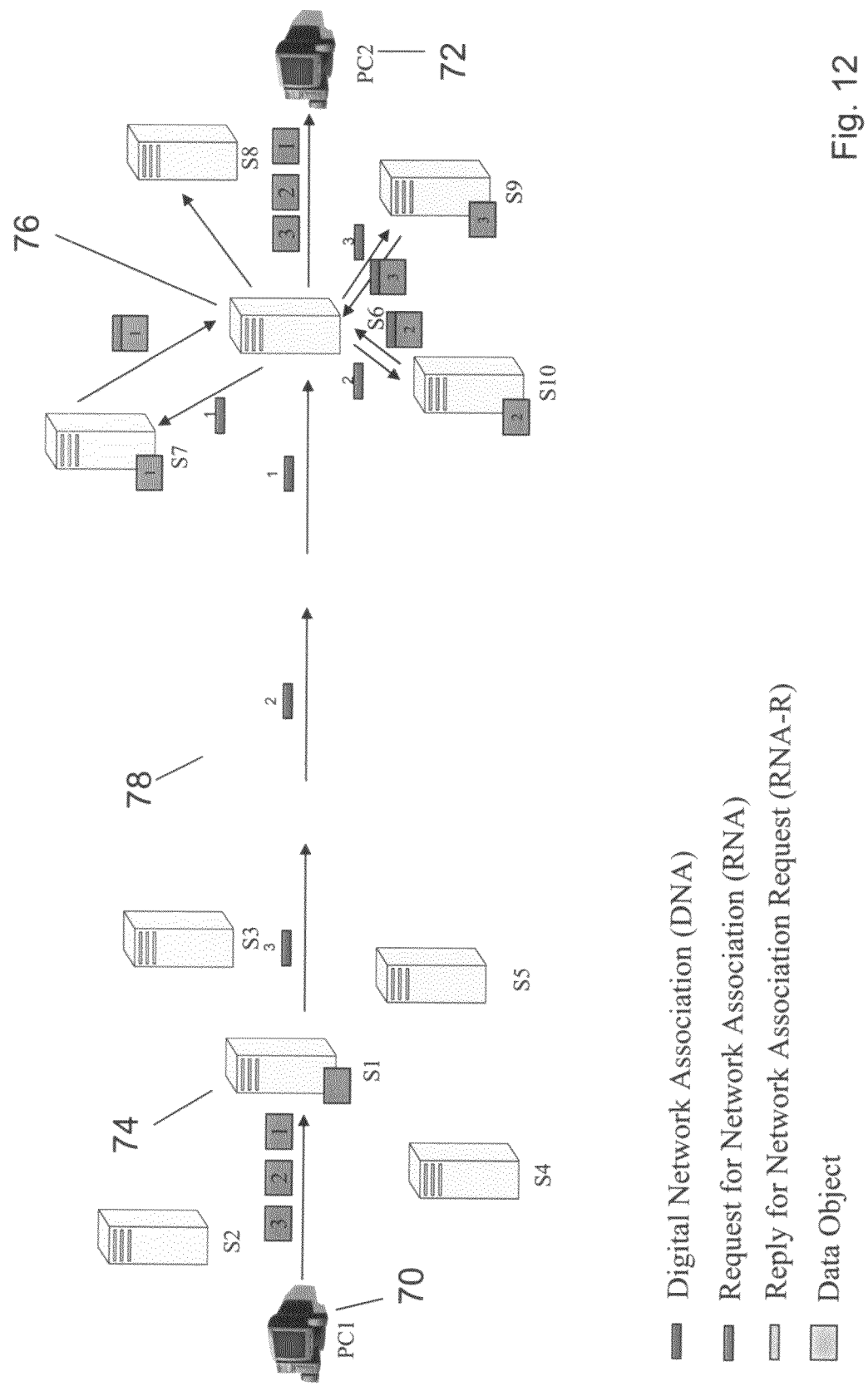
FIG. 12 is a simplified schematic diagram illustrating object transfer as shown in FIG. 11 but with the additional feature of load balancing.

Reference is now made to FIG. 12, which is a simplified schematic diagram illustrating object transfer as shown in FIG. 11 but with the additional feature of load balancing. As explained above, load balancing is used to ensure that different segments of a desired object are retrieved from different network nodes.

Computer 70 initiates an object transfer to Computer 72 over a network as before. Along the network are network nodes S1 . . . S10.

Optimization of the data transfer process is as follows:

A. Computer 70 initiates an object transfer to Computer 72 using a network protocol.

B. The local digital node (S1) intercepts the digital object transfer. The object is divided virtually into segments, as explained above. For each segment, a digital network association is calculated. Content control actions are performed on the object segments, using the unique identifier as explained above.

C. The local network node (S1) then sends the digital network association 78 instead of the object itself.

D. The remote network node (S6) then intercepts the digital network association.

E. The remote network node (S6) validates and searches for the object in its dictionary using the object identifier.

F. If the digital object is not found in the remote node S6 then the remote node tries to retrieve the object from the various different digital nodes in and out of the object transfer path based on a predefined load balancing configuration. The remote network node attempts retrieval by requesting different object segments from different object servers.

It is noted that the system does not need to be aware of the specific routes as the system utilizes different nodes that are from the very start deployed at different locations on the network so that different routes have to be used. However, if and when needed, a route information configuration (manual or automatic) can be enabled.

G. The different object segments are sent to the requesting object node (S6) as explained above. The request object node reassembles the requested object from the segments.

H. The requesting object node (S6) reassembles the original message with the object.

I. Content control actions are performed on the object, using the local unique identifier as a reference to search in the content control system.

J. The output of the content control system is then sent onwards to the intended recipient.

Figure 28:
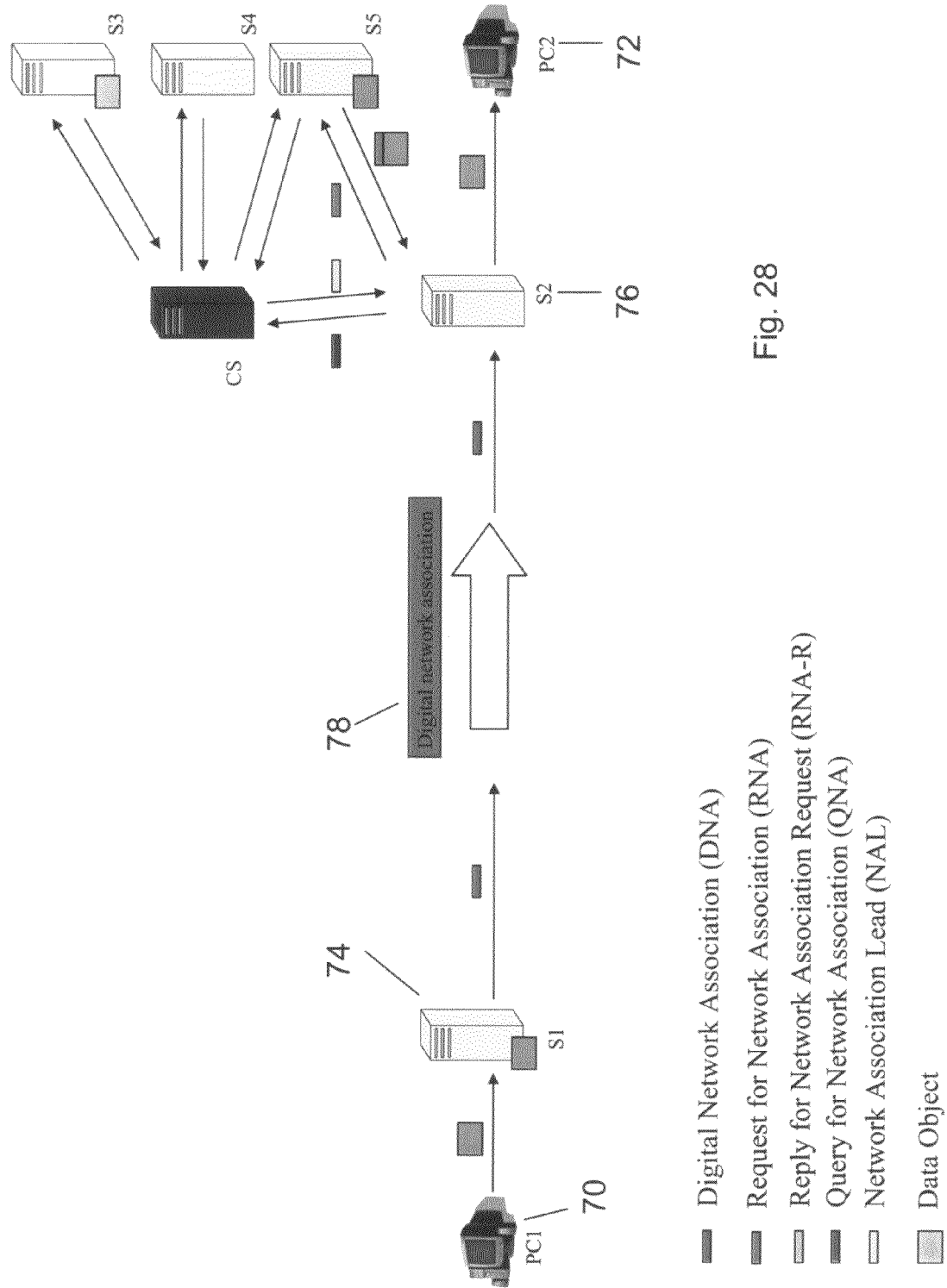
FIG. 28 is a simplified schematic diagram illustrating object transfer using a central server implementation for the feature of load balancing.

Reference is now made to FIG. 28, which is a simplified schematic diagram illustrating object transfer as shown in FIG. 11 but with the additional feature of load balancing implemented using a central authentication server CS. As explained above, load balancing is used to ensure that different segments of a desired object are retrieved from different network nodes.

Computer 70 initiates an object transfer to Computer 72 over a network as before. Along the network are network nodes S1 . . . S5 and a central authentication server CS.

Optimization of the data transfer process is as follows:

F. Computer 70 initiates an object transfer to Computer 72 using a network protocol.

G. The local digital node (S1) intercepts the digital object transfer. The object is divided virtually into segments, as explained above. For each segment, a digital network association is calculated. Content control actions are performed on the object segments, using the unique identifier as explained above.

H. The local network node (S1) then sends the digital network association 78 instead of the object itself.

I. The remote network node (S6) then intercepts the digital network association.

J. The remote network node (S6) validates and searches for the object in its dictionary using the object identifier.

E. If the digital object is not found in the remote node S6 then the remote node sends a query for network association (QNA) message to the central authentication server (CS) in order to establish the most suitable network node that can provide the needed object.

F. The central authentication server (CS) replies with a network association lead (NAL) message. The network association lead message points the remote node to network node (S5) that is the most suitable network node that can provide the needed object at the same moment.

G. The remote node retrieves the object from the node given in the network association lead message.

I. Content control actions are performed on the object, using the local unique identifier as a reference to search in the content control system.

J. The output of the content control system is then sent onwards to the intended recipient.

Considering the above issues in greater detail first of all the question arises as to the best strategy to use for updating the central server authentication database. There are numerous possible strategies that will suggest themselves to the skilled man as ways of solving this problem. One preferred strategy is to update the database every time that the query for network association message arrives. The database can be updated with the authentication information on the local node.

Another option would be to send a query to a list of neighboring nodes. From the query it is established which nodes contain the object.

Another option would be to update the central server periodically.

The preferred implementation contains a combination of some or all of the above strategies.

Figure 13:
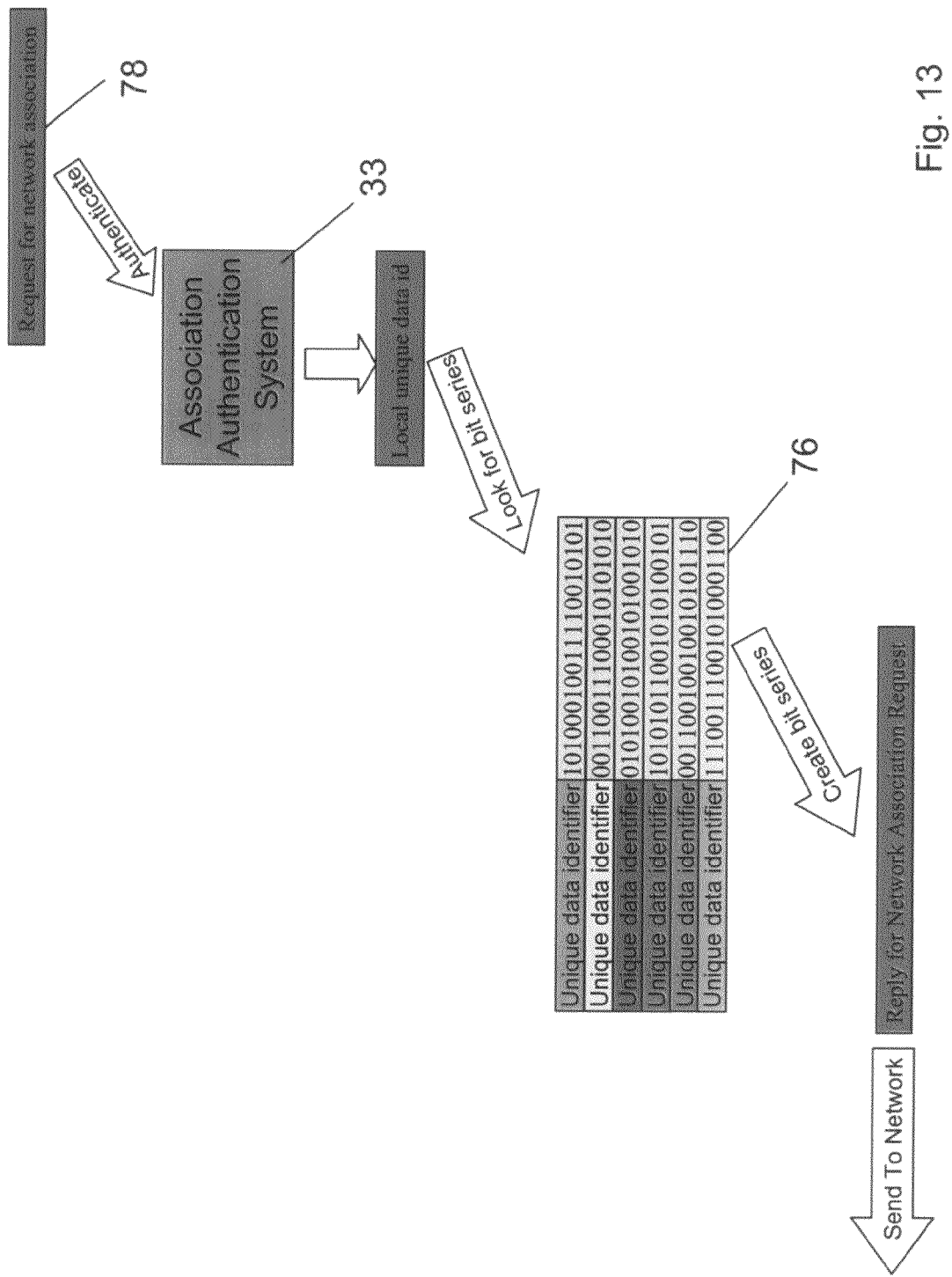
FIG. 13, is a simplified schematic diagram illustrating a simple object fetch operation from a network node according to a preferred embodiment of the present invention.

Reference is now made to FIG. 13, which illustrates a simple object fetch operation. A remote network node, is asked to fetch an object for another network node, this latter node being the node close to the recipient that requires the object. The node receives the request for network association 78, and then performs the following:

A. The digital network association is passed to the association authentication system and used to search the authentication database for a corresponding local unique data identifier.

B. If the object is found it is fetched from the local dictionary 76

C. The object is then sent to the requesting network node in a reply for a network association request message.

Figure 14:
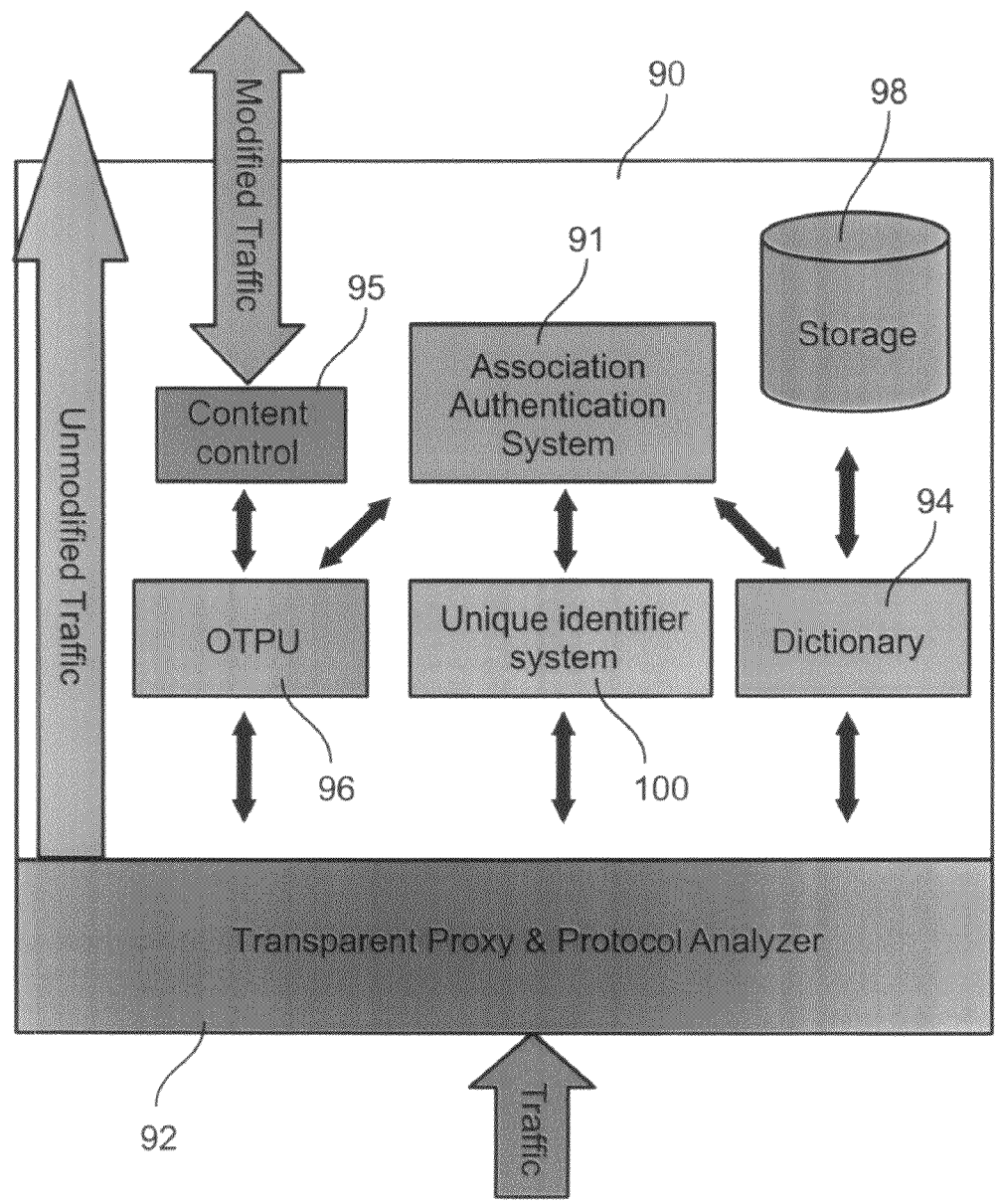
FIG. 14 is a simplified schematic diagram illustrating the architecture of a network node according to a preferred embodiment of the present invention.

It is noted that, depending on the architecture, the non-presence of an object may be indicated by a message indicating that the object is not found. Alternatively a time-out function may be used so that if the request is timed out before a response is retrieved then it is assumed that the object is not present. Reference is now made to FIG. 14 which is a simplified schematic diagram illustrating the architecture of a network node architecture according to a preferred embodiment of the present invention.

network node 90 comprises the following modules:

Transparent proxy & protocol analyzer 92 which enable message interception, object extraction and reassembly.

Dictionary 94. The dictionary contains a mapping between the unique data identifiers and the data objects it stores. The object is stored using a hash table. The hash value that is entered into the dictionary is derived from the unique data identifier itself. Furthermore, the dictionary preferably keeps a list of Least Recently Used (LRU) dictionary entries to enable efficient garbage collection, in other words to empty redundant objects from the dictionary. Each object is preferably assigned a timestamp which defines a minimal time frame in which the dictionary entry cannot be deleted by the garbage collection mechanism. Once the time frame is over then the entry is subject to possible deletion by the garbage collection mechanism.

Unique identifier system 96. The unique identifier system comprises one or more functions or a given set of functions that can create the unique identifiers for the objects, as explained above.

Storage 98, a storage system for physically storing the stored digital objects.

Universal Storage Connection Protocol (USCP) 100 is a protocol unit that enables the digital object nodes to communicate with each other. That is to say that for example it supports requests made between network nodes for objects.

Content control system 95. The content control system contains a mapping between unique data identifiers and actions that need to be performed on the related objects. Content control actions include, but are not limited to object transfer blockage, object altering, and object replacement.

The association authentication system is configured to use an intercepted digital network association message in order to provide a local unique data identifier that is authenticated to correspond to the original associated object and prevent false object match. The association authentication system is further configured to maintain an association authentication database, which manages all currently known remote associations.

Figure 15:
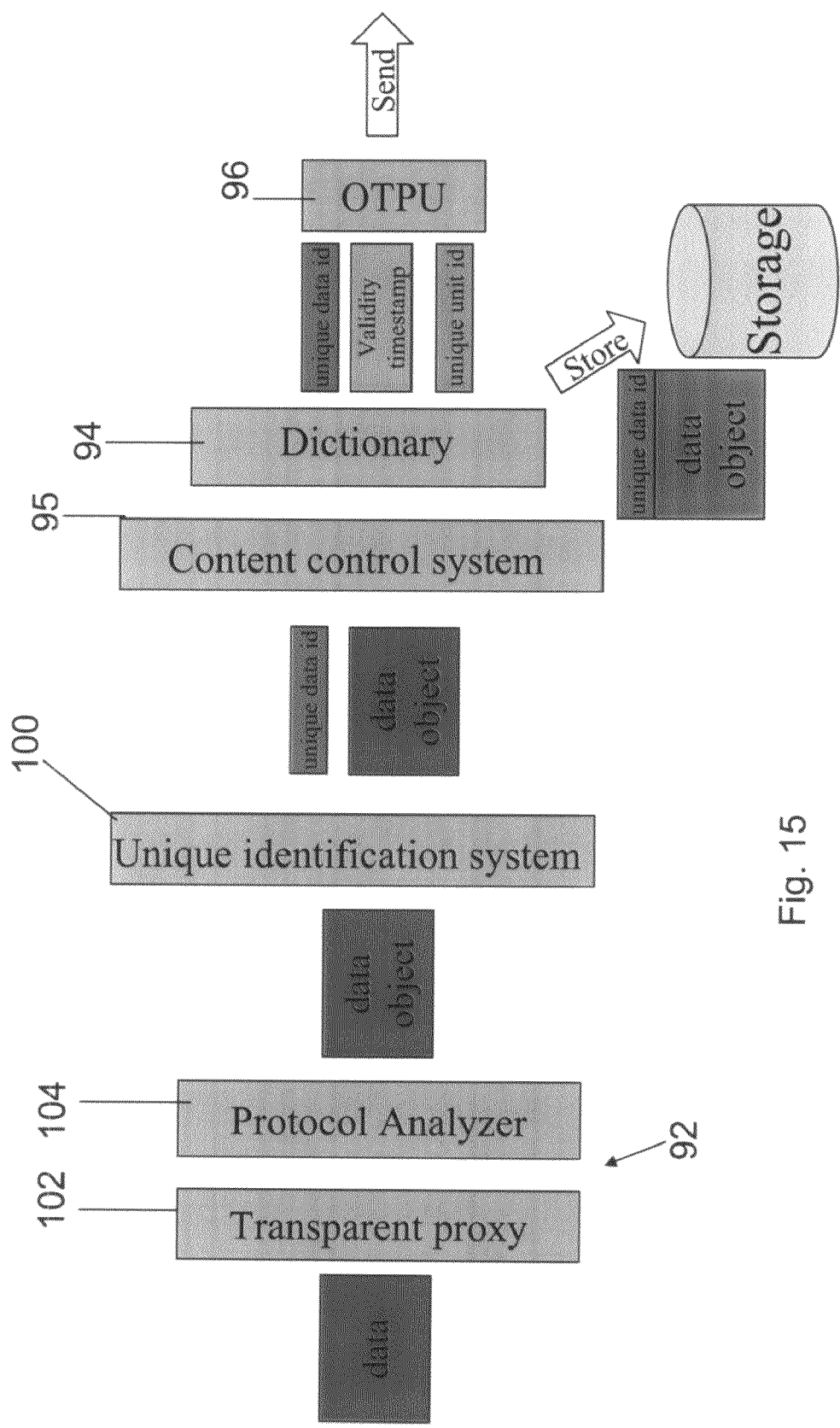
FIG. 15 is a simplified diagram showing internal data flow within a node carrying a dictionary according to a preferred embodiment of the present invention, and explaining the operation of the network node shown in FIG. 14 for the initial interception and storage of an object as the local server.

Reference is now made to FIG. 15, which is a simplified diagram showing Internal Data Flow within a node implementing the object transfer method according to a preferred embodiment of the present invention, and explaining the operation of the network node shown in FIG. 14 for the initial object interception and labeling as the local server. Parts that are the same as in previous figures are given the same reference numerals and are not referred to again except as necessary for understanding the present embodiment. Object optimization from the point of view of data flow is as follows:

A. Digital object transfer over the network is intercepted by transparent proxy 102.

B. The digital object is extracted by protocol analyzer 104.

C. Based on the extracted object the unique identification system 96 calculates the object unique data identification. This is carried out in two stages as follows. The object is preferably divided into virtual segments, in which each segment can be regarded as an object. For each segment, an individual unique data identifier is calculated.

D. Based on the unique data identifier the content control system 95 performs object control operations if and when appropriate.

E. The digital object is then added to the local dictionary 98. The object validity timestamp is updated so as to prevent deletion of the object before the remote server is able to request the object. This is so that the object can be guaranteed to be somewhere on the network when the remote server starts looking for it.

F. A digital network association message is constructed from the calculated unique data identifier, the object validity timestamp and the unique unit identifier. The digital network association message is now sent by the USCP module 100 instead of the object itself.

Figure 16:
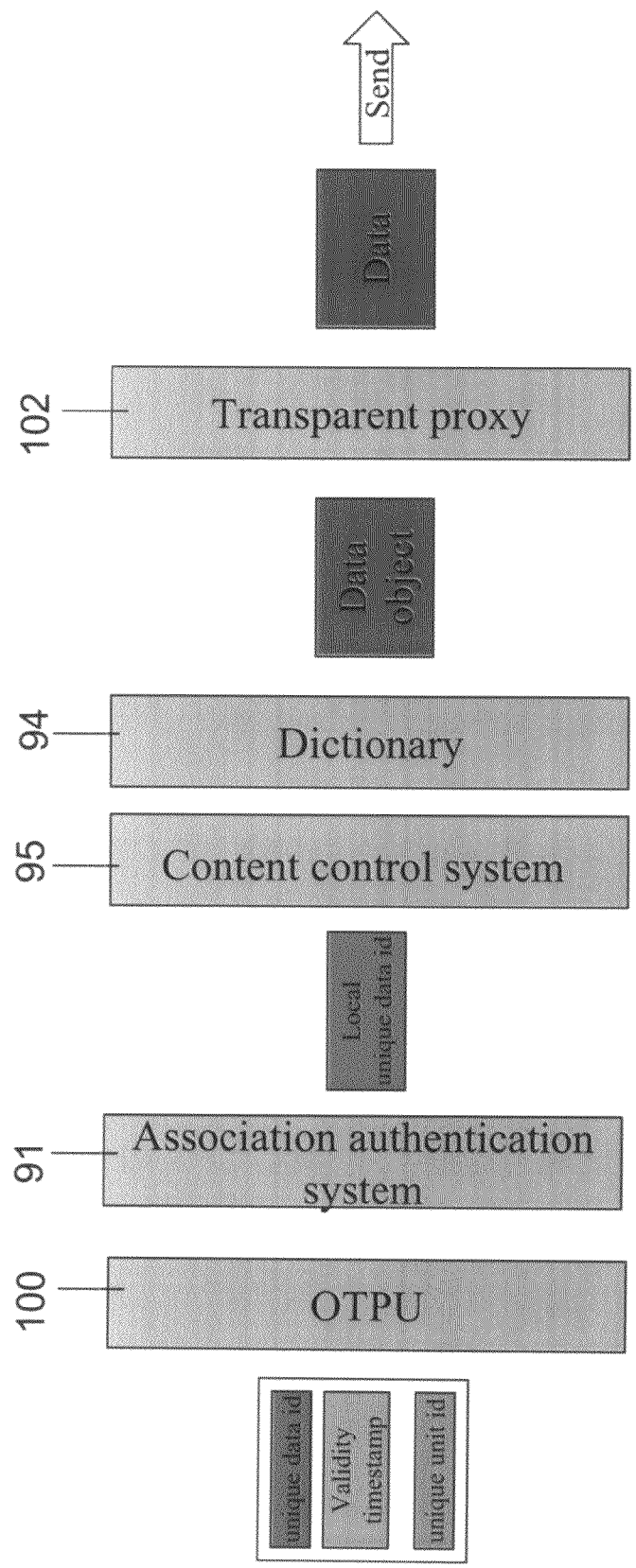
FIG. 16 is a simplified diagram which illustrates the operation of the network node of FIG. 14 in the case of object reassembly, when it serves as the remote server.

Reference is now made to FIG. 16, which illustrates the operation of the network node of FIG. 14 in the case of object reassembly, when it serves as the remote server. Parts that are the same as in previous figures are given the same reference numerals and are not referred to again except as necessary for understanding the present embodiment.

The object reassembly procedure is as follows:

A. The digital network association is preferably intercepted by the USCP module 100 and consists of three parts, the unique data identifier, the object validity timestamp and the unique unit identifier.

B. The digital network association is used by the association authentication system 91 to search for a corresponding local unique data identifier.

C. Based on the local unique data identifier the content control system 95 performs object control operations as appropriate.

D. An attempt is made to fetch the digital object from the dictionary 94, based on the local unique data identifier.

Figure 17:
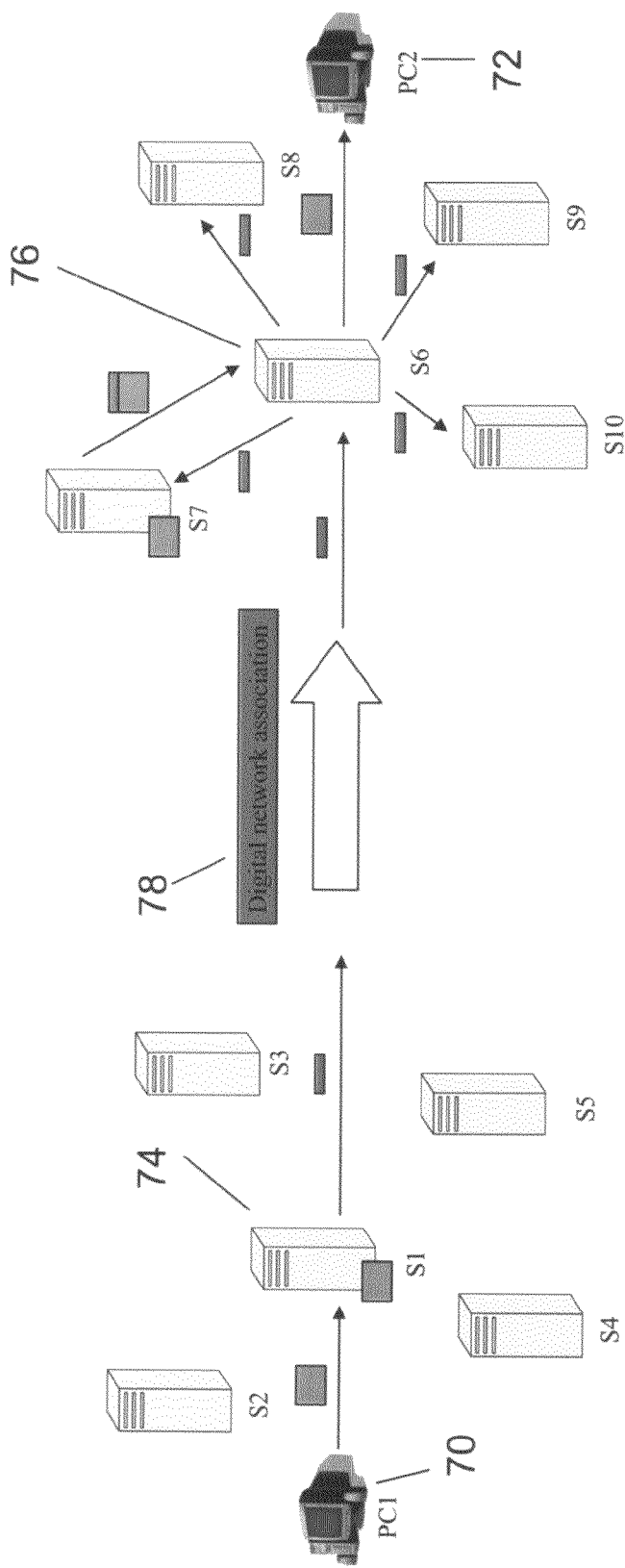
FIG. 17 is a simplified diagram illustrating the network infrastructure that may be involved in a miss scenario according to a preferred embodiment of the present invention.

E. If the object is found, the transparent proxy 102 sends the digital object to its original destination Reference is now made to FIG. 17, which illustrates the network infrastructure that may be involved in a scenario in which no object can be associated to a digital network association message at the remote network node.

General Overview—Missing in Dictionary Scenario

If the network node S6 at the recipient end does not contain a object that can be associated to the digital network association message, then the network node of S6 looks for the nearest server that does contain an object that does correspond to the digital network association message. The network node of S6 contains a list of other network nodes ordered by a metric based on network parameters. The list of network nodes includes for each object transmission also the transmitting network node, that is to say the list of network nodes includes the originating network node, which is the one network node that certainly includes the object being requested. The originating or transmitting network node preferably retains its copy of the object for a minimal time frame long enough to enable the remote network node to fetch the digital object. This behavior guaranties that at least one network node somewhere on the network holds the requested object until the request has been fulfilled. The remote network node now sends a request for network association message to the network nodes in his list and retrieves the object from the nearest (in metric perspective) network node that holds the object. In the worst case there is only one network node that holds the object, being the originating network node and in that case no transmission bandwidth is saved.

There are several preferred ways of implementing the search.

The first option is to have a pre-defined neighboring list, as defined above. After a match failure for all nodes in the list, a request for network association message is then sent transparently over the original connection back to the initiating network node.

Another option is to send a request for network association message initially over the original connection. Every network node on the path of the request for network association message attempts to fulfill the request. Then, when a match occurs the actual object or segment is sent forwards to the requesting node instead of sending the request for network association message back down the path to the originating node.

A preferred implementation contains a combination of the above options.

Figure 18:
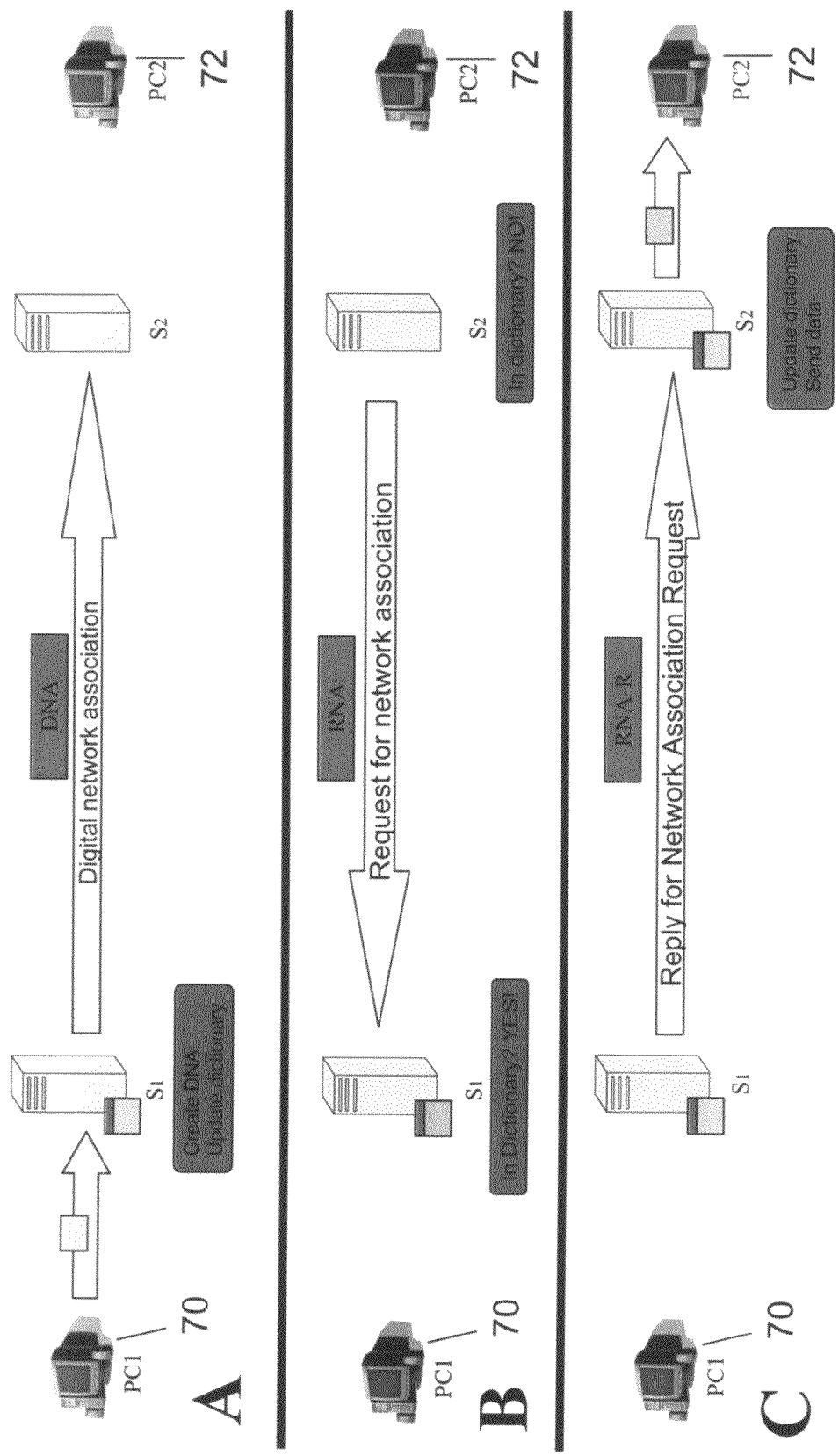
FIG. 18 is a simplified schematic diagram illustrating a procedure according to a preferred embodiment of the present invention when an object is not stored in the remote network node at the intended recipient but has to be searched for at an additional network node.

Reference is now made to FIG. 18, which is a simplified schematic diagram illustrating a procedure according to a preferred embodiment of the present invention when an object is not stored in the remote network node at the intended recipient but has to be searched for at an additional network node.

First computer 70 initiates an object transfer to second computer 72 as before. S1 and S2 are two network nodes, of which S1 is the local or sender end node and S2 is the remote or recipient end node.

The object transmission optimization procedure is as follows:

A. Message transmission:

First computer 70 initiates the object transfer to second computer 72 as described.

The local network node (S1) intercepts the digital object transfer. Object identification is calculated, i.e. unique data identifier. Content control actions are performed on the object, using the unique data identifier as a reference to search in the content control system. Certain objects may be blocked or otherwise restricted by the content control. If the object transfer is not blocked, the intercepted object is stored in the local dictionary using the unique data identification.

The local network node (S1) now sends a digital network association message, instead of sending the original object. Simultaneously, the object is stored at S1 and the unique data identifier is used as the index for retrieval of the object from the node's dictionary.

The remote digital node (S2) intercepts the digital network association message. The digital network association is used to search for a corresponding local unique data identifier.

B. In the present example, no corresponding local unique data identifier is found in the remote network node Sn. So the remote network node S2 sends a request for network association message with the missing object association identifier to the local network node S1.

C. The local network node now sends a reply for network association request message with the original object. The authentication database is updated and content control actions are performed as required on the object. The remote network node now sends the object on to its original destination.

It is noted that the above example relates to the simplified case of there being only two network nodes. In most cases there will be more nodes.

Figure 19:
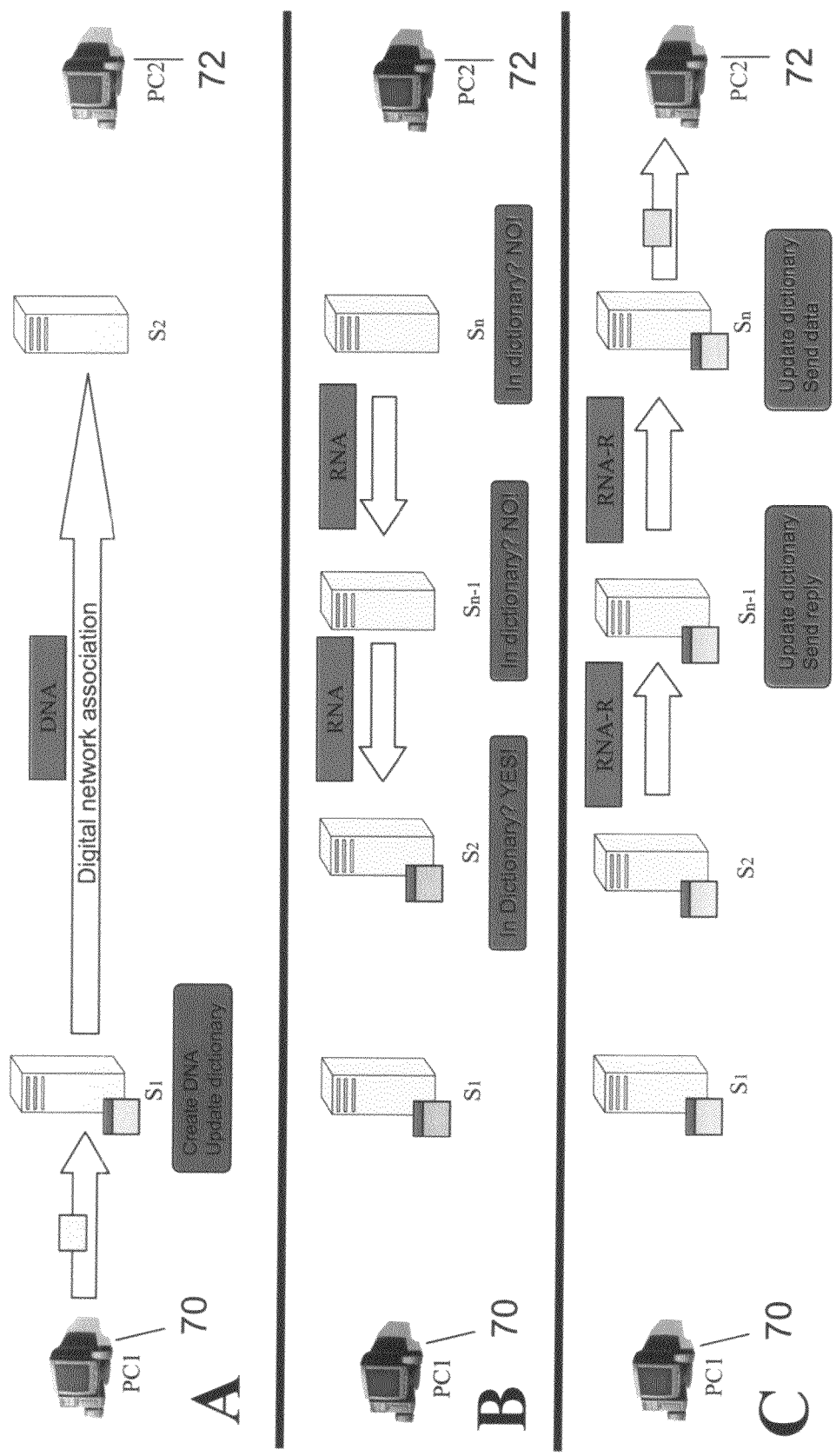
FIG. 19 is a simplified diagram illustrating a procedure according to a preferred embodiment of the present invention in which a miss occurs in the remote network node and therefore the object is fetched from a closer network node, closeness being measured in network terms.

Reference is now made to FIG. 19, which is a simplified diagram illustrating a procedure according to a preferred embodiment of the present invention in which an object is not stored in the remote network node at the intended recipient but has to be searched for at an additional network nodes and therefore the object is fetched from a closer network node, closeness being measured in network terms.

First of all, computer 70 initiates an object transfer to second computer 72 as before. The network comprises intermediate network nodes S1 . . . Sn of which S1 is the network node that is local to the sender and Sn is the remote network node from the point of view of the sender but local to the intended recipient.

The optimization of the object transmission proceeds as follows:

A. Message transmission:

First computer 70 initiates an object transfer to second computer 72 as described.

The local network node (S1) intercepts the digital object transfer as before. Object identification is calculated, i.e. unique data identifier, using the output of a mathematical hashing function, e.g. SHA512, and a local reference number. Content control actions are performed on the object as necessary, using the unique data identifier as a reference to search in the content control system. If the object transfer has not been blocked or otherwise restricted, the intercepted object is stored in the local dictionary using the object identification.

The local network node (S1) now sends a digital network association message, instead of sending the original object itself.

The remote network node (Sn) intercepts the digital network association message. The digital network association is used to search for a corresponding local unique data identifier.

B. In the present example, no corresponding local unique data identifier is found in the remote network node Sn. Therefore, the remote network node Sn proceeds to send a request for network association message with the missing object association identifier to the neighboring network nodes. The message is passed on until an network node is reached which contains the object. The various options outlined above for sending on the request for network association message and obtaining the object may be applied here.

C. The network node that is found eventually to contain the object now sends the object with a reply to the network association request message to the requesting network node. Preferably the object is also stored at intervening nodes so that the availability of the object over the network is increased. In this way the system ensures that widely used objects are widely available over the network. The requesting network node then updates its dictionary and authentication and also forwards the object to the next requesting network node until the object finally arrives at the remote network node. The remote network node now reassembles the original data stream with the object. The reassembled data stream is then sent on to the intended recipient at the original destination.

Figure 20:
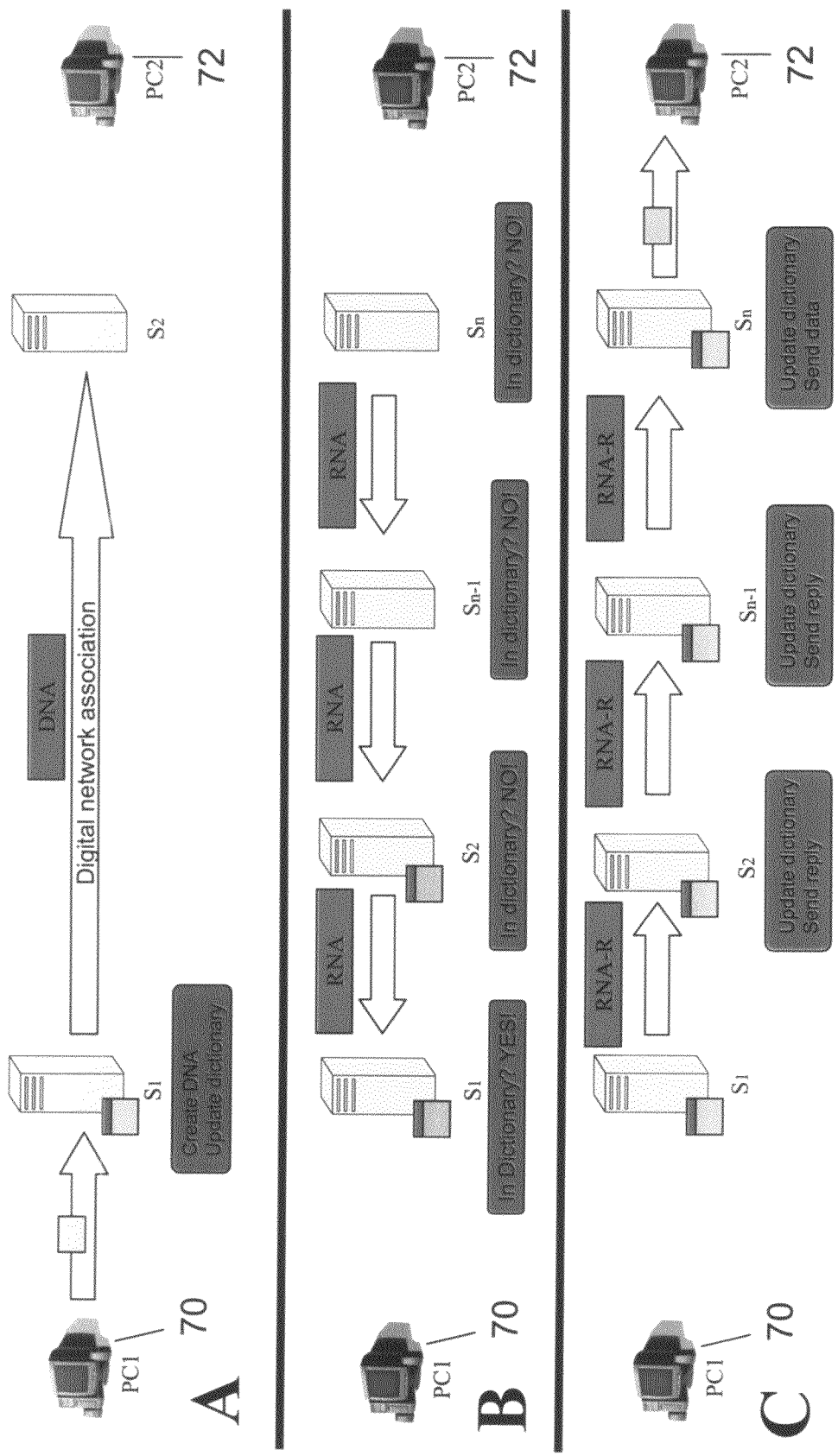
FIG. 20, is a simplified diagram illustrating a case according to a preferred embodiment of the present invention in which a miss occurs at the remote network node and in all the neighboring network nodes, so that the object is eventually fetched from the network node at the locality of the sender.

Reference is now made to FIG. 20, which is a simplified diagram illustrating a case according to a preferred embodiment of the present invention in which an object is not stored in any remote network node.

As before, computer 70 initiates an object transfer to computer 72. S1 . . . Sn represent network nodes, wherein S1 is the local network node and Sn is the remote network node.

The object transfer optimization in this scenario proceeds as follows:

A. Message transmission:

Computer 70 initiates an object transfer to PC2 as described.

The local network node (S1) intercepts the digital object transfer, exactly as before. Object identification, i.e. unique data identifier, is calculated using the output of a mathematical hashing function, e.g. SHA512, and a local reference number. Content control actions are performed on the object, using the unique data identifier as a reference to search in the content control system. If the object transfer has not been blocked or otherwise restricted, the intercepted object is stored in the local dictionary using the unique data identification.

The local network node (S1) now sends a digital network association message, instead of sending the original object itself, again as before.

The remote network node (Sn) intercepts the digital network association message. The digital network association is used to search for a corresponding local unique data identifier.

B. In the present example, no corresponding local unique data identifier is found in the remote network node Sn. Therefore the remote network node now sends a request for network association message with the missing object association identifier, to the neighboring network nodes, and these neighboring network nodes use it to check whether they have the object. In the present example they too do not have the object and the message continues to be passed around the nodes of the network until a network node is eventually located which contains the object. In this case the request eventually arrives at the originating local network node, since that is the only network node that holds the object.

C. The local network node receives the request for network association message and in response sends the object, with a reply for network association request message, to the requesting network node. The requesting network node now updates itself and proceeds to forward the object to the next requesting network node until the object finally arrives at the remote network node. The remote network node reassembles the original data stream with the object and the reassembled data stream is then sent to its original destination.

Content Control System

Figure 22:
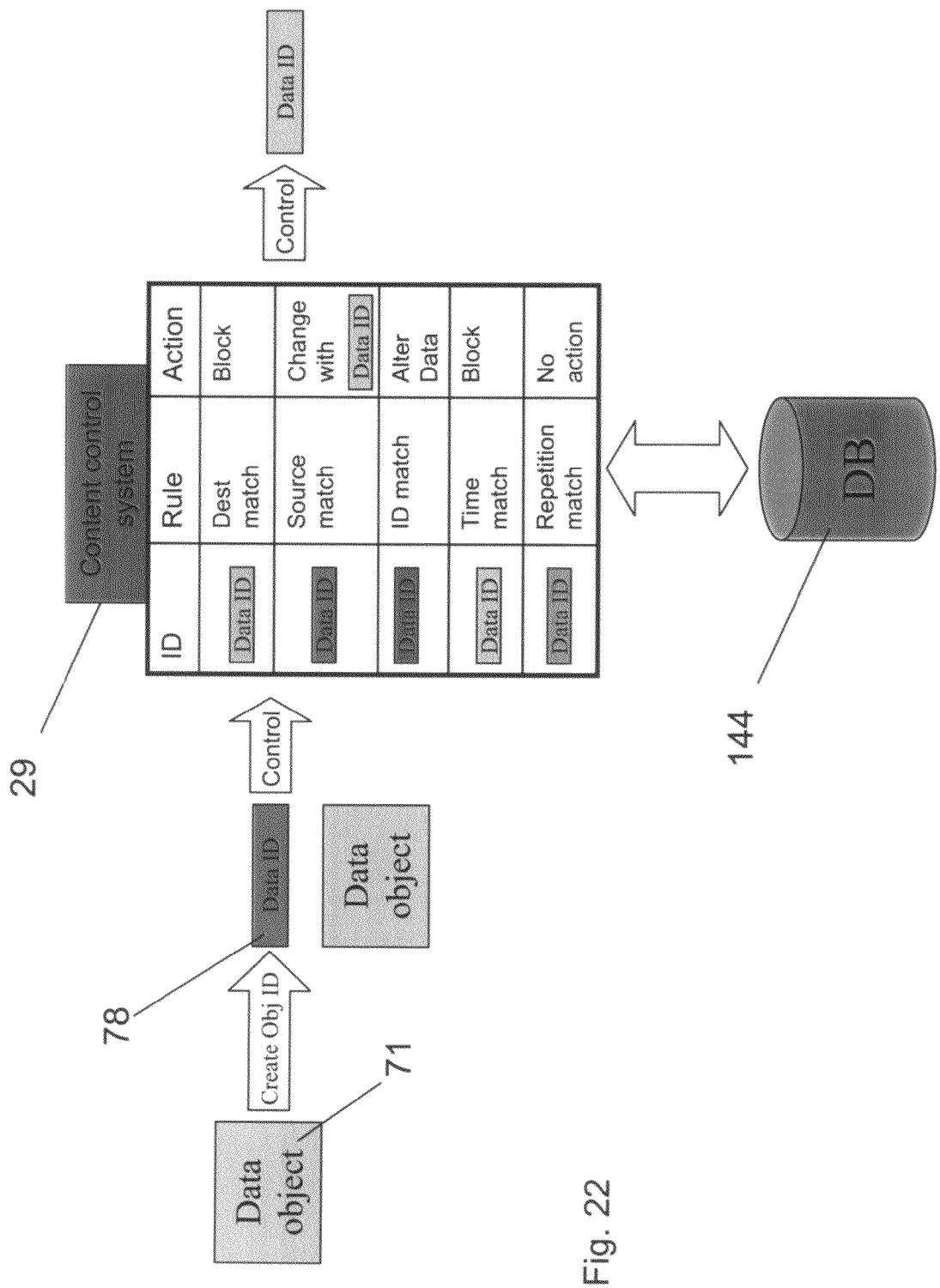
FIG. 22 is a simplified diagram illustrating the content control method.

Reference is now made to FIG. 22, which is a simplified diagram illustrating a content control method for use at an originating network node according to a preferred embodiment of the present invention. The control system 29 comprises a database 144 which holds a table having two fields. In the first field are various unique data identifiers and in the second field are corresponding restrictions and rules. The content control system operates as follows:

A. A transfer is received.

B. The Digital object is intercepted.

C. A unique data identification calculation is made using a mathematical hashing function and local reference number, as described above.

D. Content control actions are performed on the object, according to the rules table using the unique data identifier as a reference to search in the content control system. Content control actions include, but are not limited to transfer blockage, object altering, and object replacement and the content control rules include, but are not limited to, destination match, source match, identification match, time of transfer match, number of repetitions match, any other firewall like matching or any combination of match criteria.

E. The result from the content control action is then transferred to the intended destination.

The content control system may be implemented as a standalone server or as a network component.

The skilled person will understand how the content control method may be applied to the recipient end where the only difference is that the data transfer that is received is the unique identifier rather than the initiating object.

Figure 23:
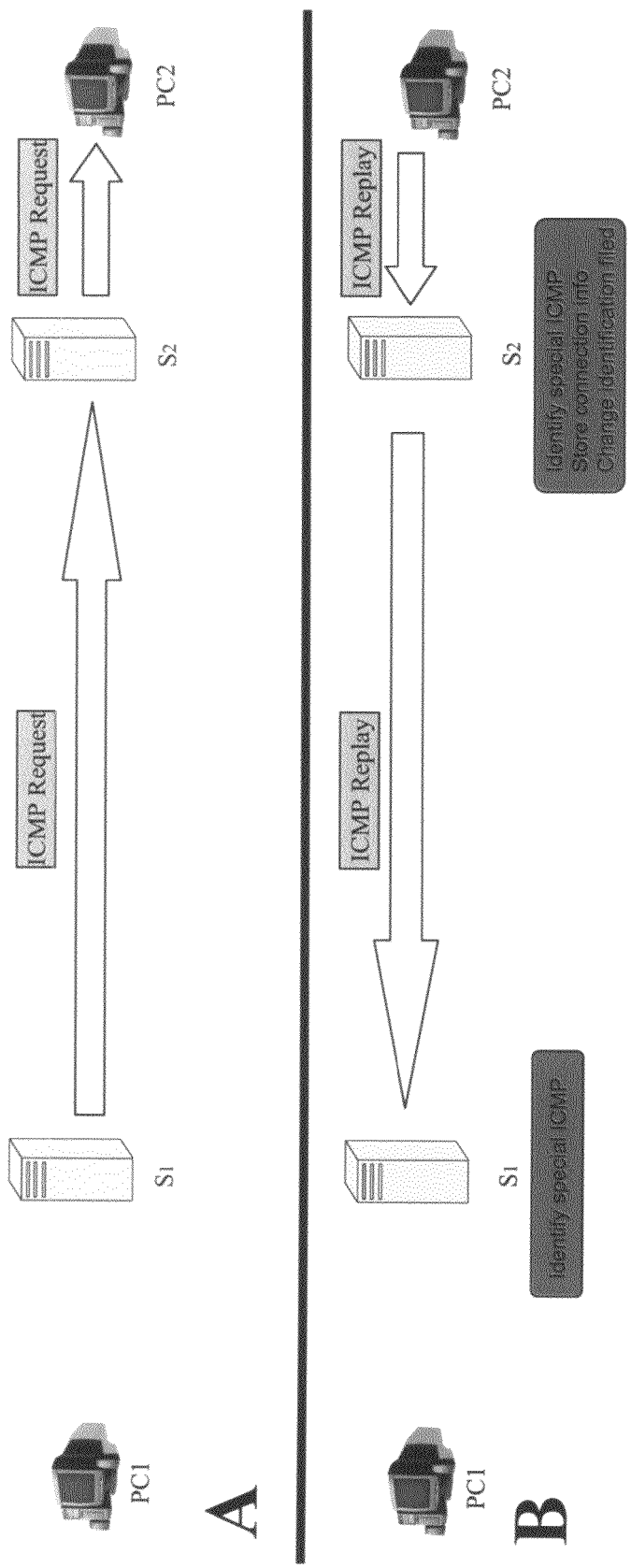
FIG. 23 is a simplified diagram illustrating a method of detection of remote network node at a close proximity to a recipient.

Method for Detection of a Remote Network Node at a Close Proximity to Recipient End Reference is now made to FIG. 23, which is a simplified schematic diagram illustrating a procedure according to a preferred embodiment of the present invention for the detection of a remote network node at close proximity to a recipient. That is to say, the network node of the present embodiments are intended to be located at or in association with strategically selected nodes of the network, but it is not envisaged that they will necessarily be located at all nodes of the network. Even if they are located at all nodes of the network it is still necessary to determine which node is the closest node to the recipient, and the system described with reference to FIG. 23 describes a method of determining the closest node to the recipient. The closest node to the recipient is the node which preferably initiates the search for the required object, hence the need for it to be positively identified.

The procedure operates as follows:
A. The local or originating network node (S1) sends an ICMP request message, also known as ping request, to the intended recipient. The ICMP request comprises two fields, an identifier field and a sequence number field. The two above-mentioned fields are preferably set in the manner described herein below in order to enable the system to recognize that it is not a regular ICMP message but a system message. The ICMP identifier and sequence number fields preferably comprise a random number, x, having a preferably predefined number of bits, and a second part which consists of a result of a function, f(x), which has been applied to the above random selected number. E.g. XOR.
B. The random number x, is preferably stored in association with the source and destination of the connection that is to be accelerated. The source and destination of the ICMP request are preferably configured to be the source and destination of the connection that is to be accelerated.
C. As a result of receiving the ICMP request, the remote recipient (PC2) preferably provides an ICMP response with identical ICMP identifier and sequence number fields.
D. Each node preferably receives the ICMP response and is able to identify that it is a system message by applying f(x) on the random number in the ICMP identifier. If the result obtained agrees with the sequence number field then the message is clearly a system message. Both x and f(x) are stored within the fields of the ICMP identifier. The two numbers may be placed in different fields or limited to predefined numbers of bits, sections of the ICMP may be predefined to store x and f(x) respectively.
E. If the outcome of f(x) equals the stored information on the ICMP sequence number fields, or in any other way that they are stored, as explained above, then the message is treated as a system message, and the node can be said to have been identified as the remote node at the closest proximity to the recipient end and it stores the source and destination IP. It is identified as such because the response is only passed on by regular nodes and not by the system nodes that identify it as a system message. The source and destination IP are preferably used to assign the node as the remote network node for the given IP address pair at the closest proximity to the recipient end.
F. The remote node thus identified as being at the closest proximity to the recipient end then changes the ICMP response identifier and sequence number fields or other storage locations using another function, g(x), which may be applied to the random number. E.g. XOR+1. The altered ICMP response identifier and sequence number fields or other locations now comprise the original random number and the outcome of the second function. This altered response is now sent back as a continuation of the ICMP message back to the originating or local network node.
G. The local node intercepts the ICMP response and thus finds out if there is an accelerating node on the path, using the ICMP identifier and sequence number fields values. The ICMP response may then be discarded.

An optional implementation enables sending layer 4 network information, e.g. protocol, port numbers, etc. in the ICMP payload. Such an implementation may be configured as required.

Figure 25:
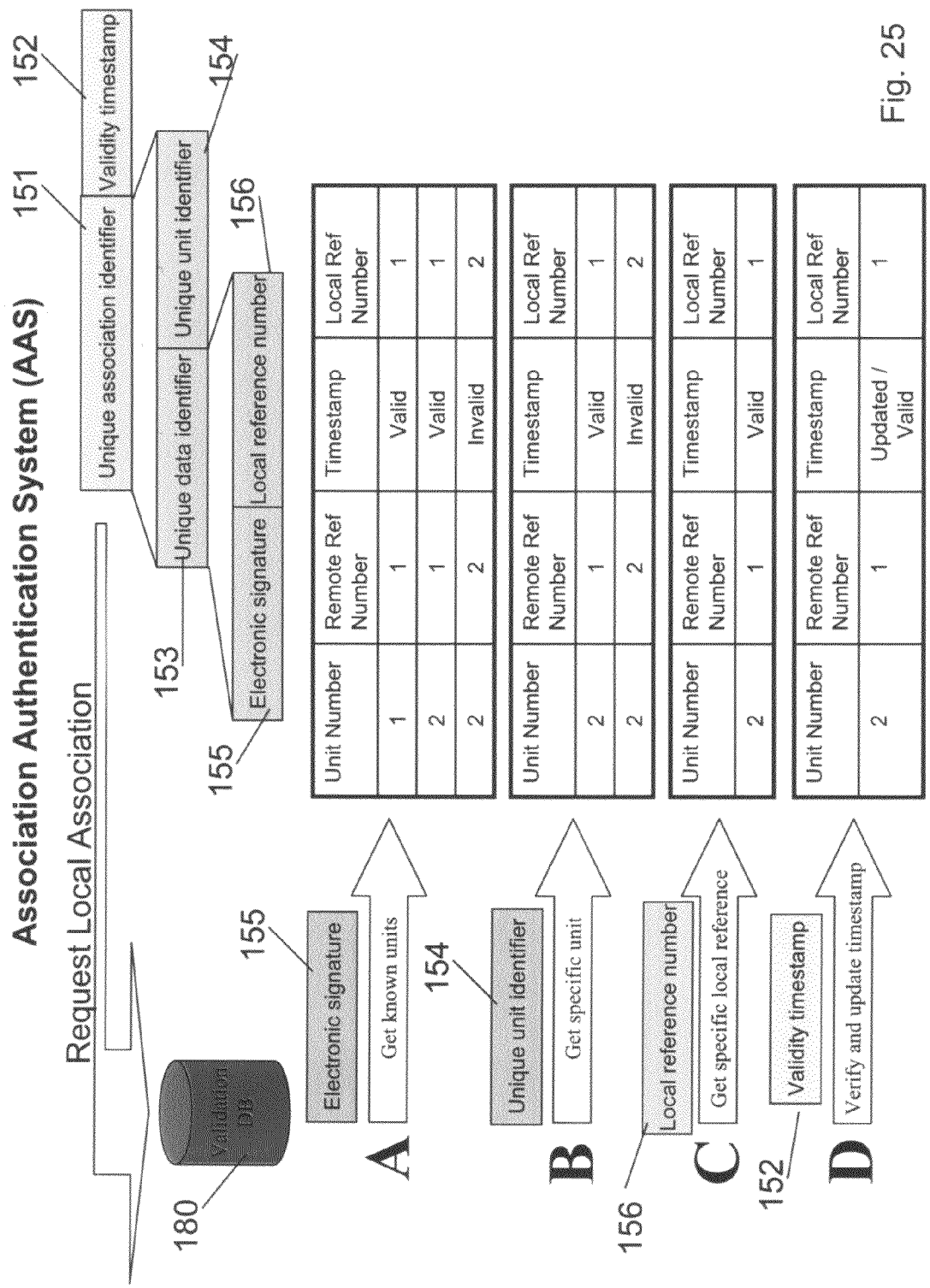
FIG. 25 is a simplified flow chart illustrating the procedure of association authentication at the association authentication system.

Reference is now made to FIG. 25, which is a simplified flow chart illustrating the association authentication procedure at the association authentication system (AAS), according to a further preferred embodiment of the present invention. The association authentication system is configured to use an intercepted digital network association message in order to provide a local unique data identifier that is authenticated to correspond to the original associated object and a prevent false object match. The association authentication system is further configured to maintain an association authentication database 180, which manage all currently known remote associations. The entries in the association authentication database will preferably be composed of an electronic signature, unique unit identifier of a remote unit, unique local reference number of a remote unit, validation timestamp and local reference number. The process comprises:
a. Searching for all database entries, which refer to the same electronic signature 155 as in the intercepted digital network association.
b. Searching for all database entries, from the list of entries found at step a, which refer to the same unique unit identifier 154 as in the intercepted digital network association.
c. Searching a database entry, from the list of entries found at step b, which refers to the same local reference number 156 as in the intercepted digital network association.
d. If such an entry is found and the validation timestamp is valid, generating a local unique data identifier using a combination of the local reference number in stored in the database entry and the given electronic signature.
e. If such an entry is found and the validation timestamp is valid, updating the validation timestamp in the database entry according to the new validation timestamp 152 given in the digital network association message.
f. Otherwise, signaling the absence of an authenticated association to an object corresponding to the digital network association message.

Figure 26:
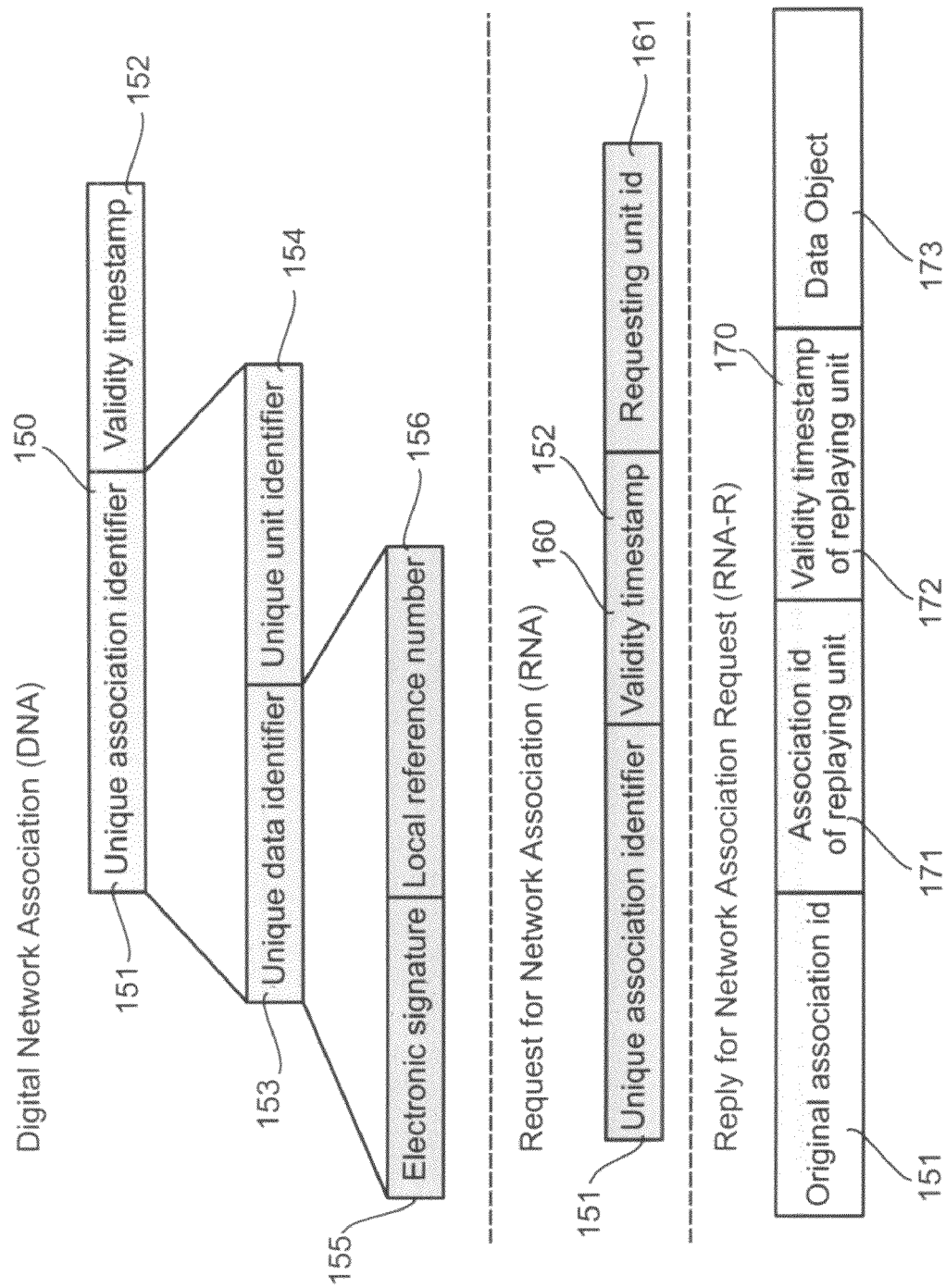
FIG. 26 is a simplified schematic diagram illustrating the preferred system messages.

Reference is now made to FIG. 26, which is a simplified diagram illustrating the preferred system messages used in the process of data transfer optimization. Preferably, the digital network association message 150 is composed of a unique association identifier 151 and a validity timestamp 152. Preferably, the unique association identifier is composed of a unique data identifier 153 and a unique unit identifier 154.

Preferably, the unique data identifier is composed of an electronic signature of the data segment 155 and a local reference number 156. Preferably, the unique unit identifier 154 is a predefined identifier set to represent the sending network node. Preferably, the validity timestamp 152 defines a minimal time frame in which the unique data identifier is associated with the data segment on the sending unit. Preferably, the request for network association message 160 is composed of a unique association identifier 151, a validity timestamp 152 and the requesting unit id 161. Preferably, the unique association identifier and the validity timestamp are taken from the digital network association message that triggered the request for network association. Preferably, the reply for network association request message 170 is composed of the original association id, Association id of the replying unit, Validity timestamp of the replying unit and the associated data object. Preferably, the original association id is taken from request for network association message.

Figure 27:
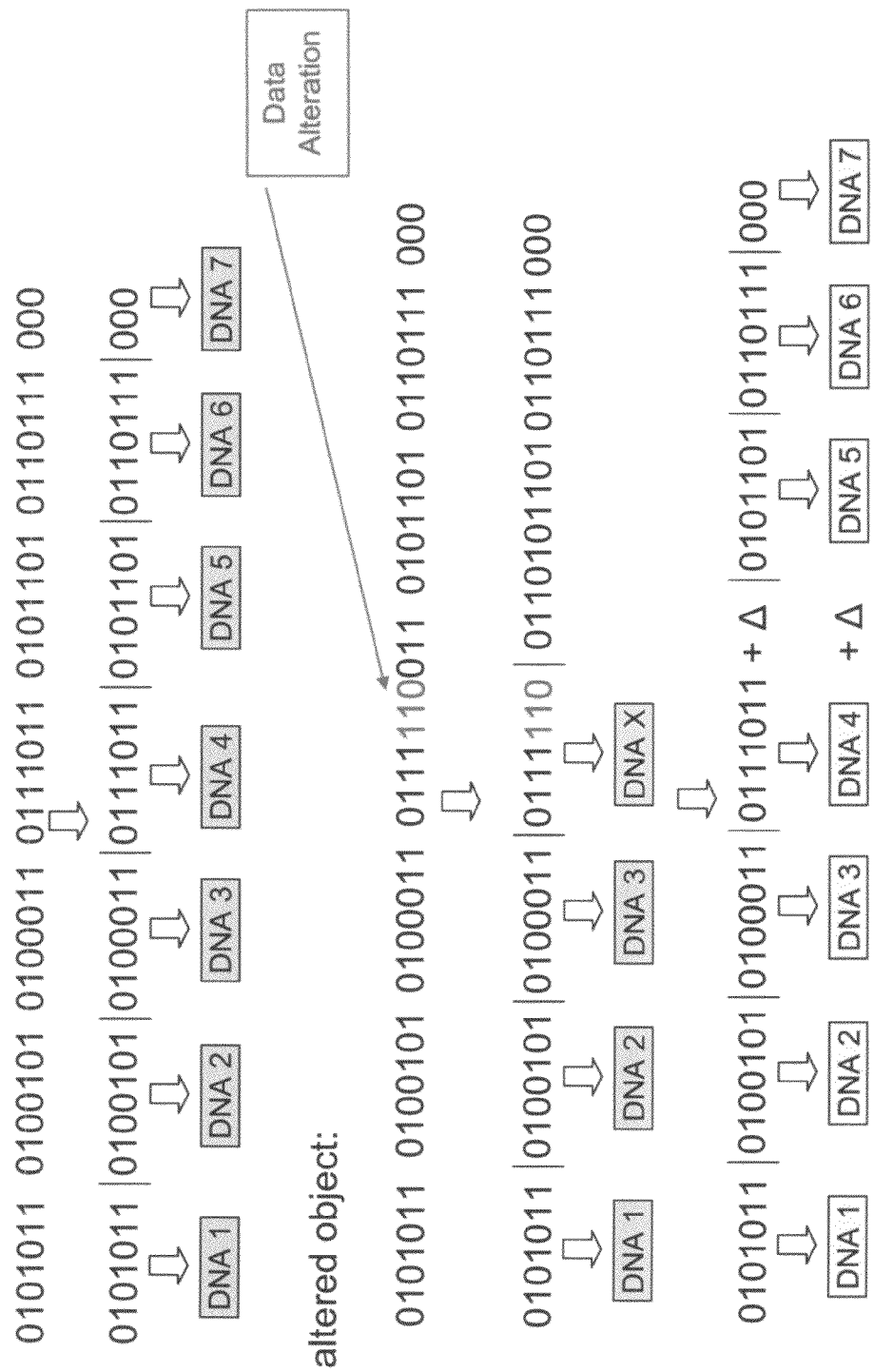
FIG. 27 is a simplified flow chart illustrating the procedure of transferring an altered object over a network.

Reference is now made to FIG. 27, which is a simplified diagram illustrating the process of transferring an altered object over a network, according to a further preferred embodiment of the present invention. As long as the object is being transmitted in its original form across the network, it would preferably be segmented into smaller objects and would be transferred according to the method as described before. At this stage the system learns the sequence of object segments, e.g. dna1, dna2, dna3, etc. When an altered object is sent to the network, the altered segment produces a different DNA than the one expected by the system. The system will detect the altered segment and would try to represent the altered segment by the original data segment plus changes. If the differences between the original data and the altered data are relatively small, the original DNA is sent plus the differences in data and the system continues to expect to receive the original segments sequence. Otherwise the system sends the newly created DNA and regards the future incoming data as a new data sequence.

Using the above technique it is thus possible to improve the efficiency of transferring objects that are partially modified over time. Each segment is treated independently so that unmodified segments may be gathered from locations at which they were deposited earlier and newly modified segments are gathered from locations at which they have been recently deposited, again reducing overall network load.

The present embodiments provide at least some of the following advantages over prior art systems:

They substantially eliminate redundant data transfer across the network.
They reduce the overall bandwidth consumption of the network.
They reduce the overall server load in the network.
They reduce the overall network latency.
They provide minimal, almost zero, redundant data transfer time.
The embodiments are applicable for all kinds and sizes of digital objects.
The embodiments are applicable to any data communications network environments.
The embodiments are applicable to all digital object transfer regardless of their transfer context.
The embodiments enable elimination of redundant transfers regardless of external properties, e.g. HTTP URL, file path, URL mime-type, file name, etc.
The embodiments enable entire objects to be accelerated regardless of the order and manner in which the segments are passed on the network and regardless of the mix with other objects and information during transfer on the data network.
The embodiments provide a non content aware solution. It is not possible to reconstruct the content from the identifiers. The embodiments enable delivery of a redundancy elimination solution without exposing the network providers to any legal responsibility for the content that is accelerated thereby.
It is a non CPU intensive solution. CPU power is required for generating and comparing the identifiers and passing around the search requests, but this is more than made up for by the power saved in having less redundant traffic.
The embodiments are equally beneficial for compressible and non-compressible data, and it makes no difference whether the data is actually compressed or not.
The embodiments enable utilization of network paths that differ from the network paths leading from the sender to the receiver.
The embodiments enable a reduction in transfer time even in those cases where the object is not present at the destination object network node dictionary, as long as the object is present at one intermediate cache which is closer to the destination cache than the source network node.
The embodiments enable smooth distribution of network load between the network paths leading from the sender to the receiver and other network paths.
The embodiments enable network content control without any affect on privacy and without actually being a content aware solution, i.e. the present embodiments preferably do not affect the transferred content without additional external information. The external information that is required enables a simple match and still does not enable the identification of the true content.
The embodiments enable dynamic alteration of the content based on configuration e.g. request for a dvd movie in Israel will result in a region 3 coding while a request for the same dvd from the US will result in a region 1 coding.
The embodiments enable detection of a remote network node at a close proximity to recipient end.

It is expected that during the life of this patent many relevant data transmission, network and caching devices and systems will be developed and the scope of the corresponding terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for transferring data objects over a network, comprising:
   at a sending locality on said network, a first electronic processor comprising:
   an interception unit for intercepting and caching passing objects on a way to respective recipients; and
   an identification unit, associated with said interception unit for generating a unique identifier for said passing object, and configured to use a hashing function in said generating, said unique identifier being generated such as to exclusively identify said respective passing object, said interception unit being configured to replace said passing object with said unique identifier to pass over said network and further to use said unique identifier to label said object in said cache; and
   at a receiving locality on said network, a second electronic processor comprising:
   a search unit for searching for a corresponding object in at least one node dictionary using said unique identifier to identify said corresponding object, thereby to supply said corresponding object to a respective recipient from a relatively nearby node dictionary without carrying out redundant network transfer, wherein said search unit is further configured to modify said searching in accordance with load balancing considerations, said node dictionary being an instance at a respective node of a data store in which objects are cached and using which data store a same identifier always produces a same object at all nodes.

2. Apparatus according to claim 1, wherein said search unit is configured to provide:
   a) local searching,
   b) if said local searching is unsuccessful, then searching at a closest network node, and
   c) if said local searching is unsuccessful then continuing to search at successively distant network nodes.

3. Apparatus according to claim 2, wherein said load balancing considerations are obtained from a central load balancing control node.

4. Apparatus according to claim 2, wherein distance of nodes is determined by networking parameters, and wherein said networking parameters comprise at least one of a group including: physical distance, bandwidth, roundtrip time, latency, number of routing hops and economical cost.

5. Apparatus according to claim 1, wherein said object is segmented prior to storage such that each segment is searchable and transportable on its own.

6. Apparatus according to claim 5, further configured to include a change in a segment as a delta with the original segment.

7. Apparatus according to claim 1, wherein, upon modification of said segmented object, each segment is treated independently.

8. Apparatus according to claim 1, wherein said identification function is substantially injective.

9. Apparatus according to claim 8, wherein said identification unit is configured to use a hashing function as said substantially injective identification function.

10. Apparatus according to claim 1, wherein said identification unit is configured to use a fully injective identification function.

11. Apparatus according to claim 1, wherein copies of respective passing objects are stored at a plurality of nodes of said network, each in association with said respective unique identifier, such that said copy is retrievable from each node using said respective unique identifier.

12. Apparatus according to claim 11, wherein said intercepting unit is configured to segment passing objects prior to caching, the apparatus further comprising a load balancing unit associated with said search unit, such that said load balancing unit is able to retrieve different segments of said object from different nodes of said network, thereby to provide relatively balanced network utilization.

13. Apparatus according to claim 1, further comprising a content control unit configured to store unique identifiers relating to data objects whose distribution it is intended to control, together with rules for said control, such that said control unit can be searched using a given unique identifier to retrieve a corresponding rule to be applied to further distribution of said object.

14. Apparatus according to claim 13, wherein said rule is any one of a group comprising transfer blockage, object altering, and object replacement.

15. Apparatus according to claim 1, wherein said sending locality further comprises a receiving locality identification unit configured to identify a system component at said receiving locality by sending an Internet Control Message Protocol (ICMP) message to said recipient, and allowing a response to said ICMP message to be recognized and altered by said system component, thereby to identify said system component as a component at said receiving locality.

16. Apparatus according to claim 1, wherein said sending locality further comprises a receiving locality identification unit configured to identify a closest system component to said recipient by sending an Internet Control Message Protocol (ICMP) message to said recipient, and allowing a response to said ICMP message to be recognized and altered by a first system component that said response passes, thereby to identify said system component as a closest system component to said recipient.

17. A method of transferring data objects over a network, comprising:
   at a sending locality on said network, using an electronic processor for:
   intercepting and storing passing objects on a way to respective recipients;
   generating a unique identifier for said passing object, said unique identifier being generated such as to exclusively identify said respective passing object, said generating using a hashing function;
   replacing said passing object with said unique identifier to pass over said network; and
   using said unique identifier to label said object in said cache; and
   at a receiving locality on said network:
   searching for a corresponding object in at least one network node using said unique identifier to identify said corresponding object, thereby to supply said corresponding object to a respective recipient from a relatively nearby network node without carrying out redundant network transfer and modifying said searching in accordance with load balancing considerations.

18. The method of claim 17 wherein said searching is initially carried out locally, then at a node close to said intended recipient and if a corresponding object is still not found then expanding said search to steadily more distant nodes.

19. The method of claim 18, wherein distance of nodes is determined using networking parameters comprising at least one of a group including physical distance, bandwidth, roundtrip time, latency, number of routing hops and economical cost.

20. The method of claim 17, comprising segmenting said passing objects to predetermined sizes before said storing in caches and before said creating a unique identifier.

21. The method of claim 20, wherein said searching is carried out at a plurality of nodes on different paths to said intended recipient, thereby to ensure relative network usage balance.

* * * * *